(12) United States Patent
Ashcraft et al.

(10) Patent No.: US 11,593,152 B1
(45) Date of Patent: *Feb. 28, 2023

(54) APPLICATION HOSTING IN A DISTRIBUTED APPLICATION EXECUTION SYSTEM

(71) Applicant: Google LLC, Mountain View, CA (US)

(72) Inventors: Kenneth Ashcraft, Palo Alto, CA (US); Jon P. McAlister, Millbrae, CA (US); Kevin A. Gibbs, San Francisco, CA (US); Ryan C. Barrett, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,653

(22) Filed: Jun. 17, 2021

Related U.S. Application Data

(63) Continuation of application No. 16/727,471, filed on Dec. 26, 2019, now Pat. No. 11,068,301, which is a continuation of application No. 15/474,321, filed on Mar. 30, 2017, now Pat. No. 10,558,470, which is a continuation of application No. 14/468,135, filed on Aug. 25, 2014, now Pat. No. 9,658,881, which is a continuation of application No. 13/466,061, filed on May 7, 2012, now Pat. No. 8,819,238, which is a continuation of application No. 13/212,142, filed on Aug. 17, 2011, now Pat. No. 8,195,798, which is a
(Continued)

(51) Int. Cl.
*G06F 15/173* (2006.01)
*G06F 9/48* (2006.01)
*H04L 41/0213* (2022.01)
*G06F 9/445* (2018.01)
*G06F 9/50* (2006.01)
*H04L 65/1063* (2022.01)

(52) U.S. Cl.
CPC ............. *G06F 9/48* (2013.01); *G06F 9/445* (2013.01); *G06F 9/44505* (2013.01); *G06F 9/5016* (2013.01); *H04L 41/0213* (2013.01); *H04L 65/1063* (2013.01)

(58) Field of Classification Search
CPC ... H04L 41/0213; H04L 65/1063; G06F 9/48; G06F 9/445; G06F 9/44505; G06F 9/5016
USPC ........................................................ 709/224
See application file for complete search history.

(56) References Cited

U.S. PATENT DOCUMENTS 5,469,545 A 11/1995 Vanbuskirk et al.
6,801,927 B1 10/2004 Smith et al.
(Continued)

*Primary Examiner* — Alan S Chou
(74) *Attorney, Agent, or Firm* — Lerner, David, Littenberg, Krumholz & Mentlik, LLP

(57) ABSTRACT

In an application execution system having a plurality of application servers, each application server stores a plurality of applications, and has computational resources for executing applications in response to received requests. Each application server also includes instructions for loading a respective application into volatile storage and executing the application in response to a request from a client, and for returning a result. A generic application instance may be cloned, creating a pool of generic application instance clones that can be loaded with code for a requested application to produce an application instance. The application instance can then be stored in a cache to be used for a future application request.

18 Claims, 15 Drawing Sheets

Related U.S. Application Data continuation of application No. 12/331,351, filed on Dec. 9, 2008, now Pat. No. 8,005,950.

(56) References Cited

U.S. PATENT DOCUMENTS

| | | | |
|---|---|---|---|
| 7,475,197 B1 | 1/2009 | Bouge et al. | |
| 7,539,631 B1 | 5/2009 | El-Haj | |
| 7,624,168 B2 * | 11/2009 | Kim | H04L 67/1008 |
| | | | 709/217 |
| 7,634,646 B2 | 12/2009 | Fujimori et al. | |
| 7,669,026 B2 | 2/2010 | Boss et al. | |
| 7,685,597 B1 | 3/2010 | Czajkowski et al. | |
| 7,788,544 B2 | 8/2010 | Allen et al. | |
| 7,877,482 B1 | 1/2011 | Ashcraft et al. | |
| 8,005,950 B1 | 8/2011 | Ashcraft et al. | |
| 8,015,272 B2 | 9/2011 | Yoshiuchi et al. | |
| 8,161,475 B2 | 4/2012 | Araujo, Jr. et al. | |
| 8,195,798 B2 | 6/2012 | Ashcraft et al. | |
| 8,312,425 B2 | 11/2012 | Hepper et al. | |
| 8,494,520 B2 | 7/2013 | Foottit et al. | |
| 8,819,238 B2 | 8/2014 | Ashcraft et al. | |
| 11,068,301 B1 * | 7/2021 | Ashcraft | G06F 9/445 |
| 2002/0055984 A1 | 5/2002 | Chang et al. | |
| 2003/0217077 A1 | 11/2003 | Schwartz et al. | |
| 2004/0003347 A1 | 1/2004 | Saidenberg et al. | |
| 2004/0111725 A1 * | 6/2004 | Srinivasan | G06F 9/4856 |
| | | | 718/105 |
| 2004/0193574 A1 | 9/2004 | Suzuki | |
| 2004/0267897 A1 * | 12/2004 | Hill | G06F 9/505 |
| | | | 709/217 |
| 2005/0015804 A1 | 1/2005 | LaJoie et al. | |
| 2005/0021917 A1 | 1/2005 | Mathur et al. | |
| 2005/0055435 A1 | 3/2005 | Gbadegesin et al. | |
| 2005/0097132 A1 | 5/2005 | Cochran et al. | |
| 2005/0149940 A1 * | 7/2005 | Calinescu | G06F 9/5061 |
| | | | 718/104 |
| 2005/0177832 A1 | 8/2005 | Chew | |
| 2005/0179918 A1 | 8/2005 | Kurumisawa et al. | |
| 2005/0193115 A1 | 9/2005 | Chellis et al. | |
| 2005/0198102 A1 | 9/2005 | Hahn et al. | |
| 2006/0031165 A1 | 2/2006 | Nave et al. | |
| 2006/0059156 A1 | 3/2006 | Janes et al. | |
| 2006/0075101 A1 | 4/2006 | Anerousis et al. | |
| 2006/0179061 A1 | 8/2006 | D'Souza et al. | |
| 2006/0190602 A1 | 8/2006 | Canali et al. | |
| 2007/0112785 A1 | 5/2007 | Murphy et al. | |
| 2007/0143702 A1 | 6/2007 | Maggi | |
| 2007/0174839 A1 | 7/2007 | Takahashi et al. | |
| 2008/0034160 A1 | 2/2008 | Neiman et al. | |
| 2008/0082955 A1 | 4/2008 | Andreessen et al. | |
| 2008/0091902 A1 | 4/2008 | Lee | |
| 2008/0172677 A1 | 7/2008 | Tripathi et al. | |
| 2008/0209447 A1 | 8/2008 | Moore et al. | |
| 2008/0244600 A1 * | 10/2008 | Wong | G06F 9/50 |
| | | | 718/104 |
| 2008/0307438 A1 | 12/2008 | Creamer et al. | |
| 2009/0106424 A1 | 4/2009 | Safari et al. | |
| 2009/0117889 A1 | 5/2009 | Varanda | |
| 2010/0043016 A1 | 2/2010 | Anzai | |
| 2010/0114705 A1 | 5/2010 | Hoyle | |
| 2011/0225123 A1 | 9/2011 | D'Souza et al. | |
| 2012/0173734 A1 | 7/2012 | Kimbrel et al. | |
| 2014/0040343 A1 | 2/2014 | Nickolov et al. | |

* cited by examiner

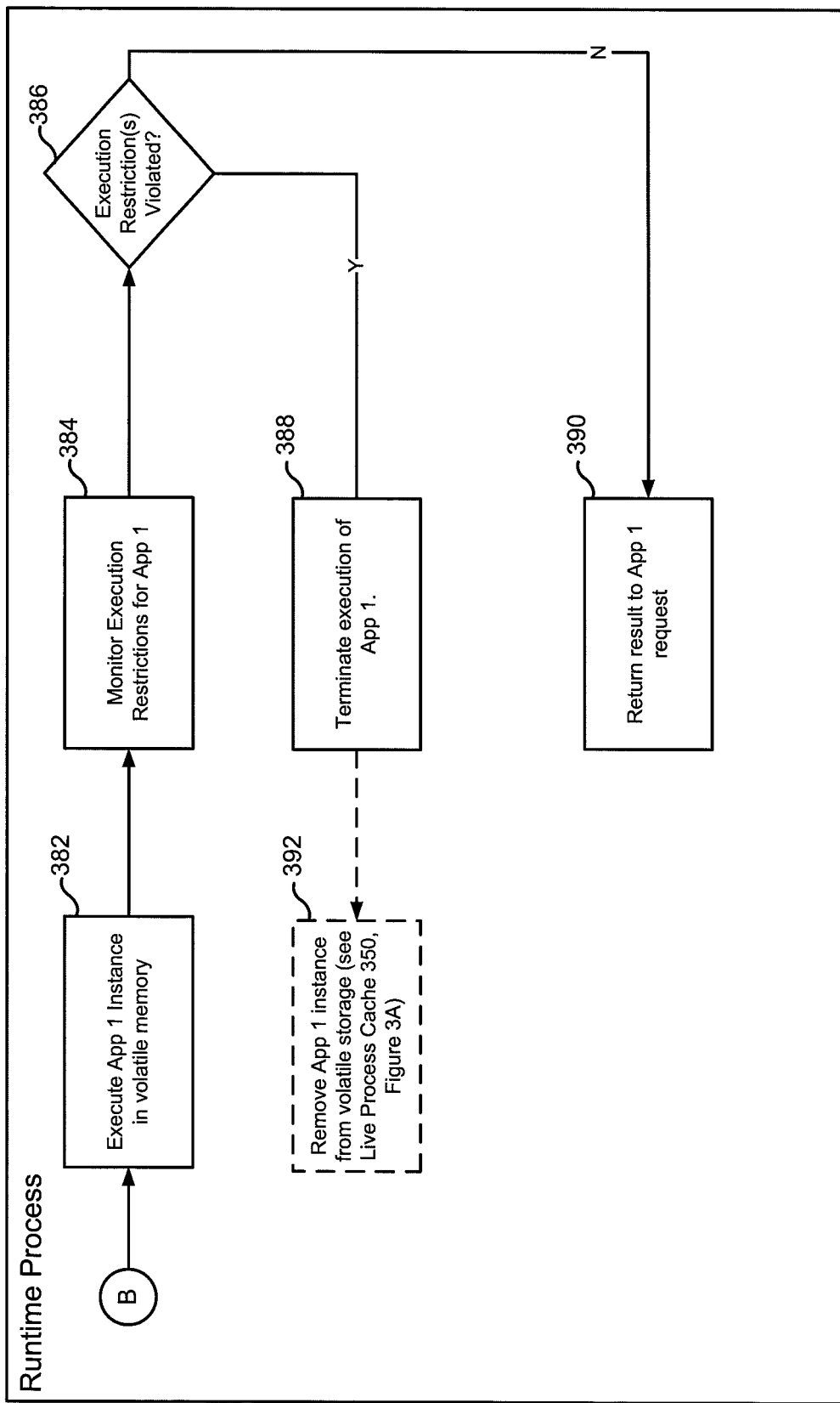

APPLICATION HOSTING IN A DISTRIBUTED APPLICATION EXECUTION SYSTEM

CROSS-REFERENCE TO RELATED APPLICATIONS

This application is a continuation of U.S. patent application Ser. No. 16/727,471, filed Dec. 26, 2019, entitled "Application Hosting In A Distributed Application Execution System," which is a continuation of U.S. patent application Ser. No. 15/474,321, filed Mar. 30, 2017, entitled "Application Hosting in a Distributed Application Execution System," now U.S. Pat. No. 10,558,470, which is a continuation of U.S. patent application Ser. No. 14/468,135, filed Aug. 25, 2014, entitled "Application Hosting in a Distributed Application Execution System," now U.S. Pat. No. 9,658,881, which is a continuation of U.S. patent application Ser. No. 13/466,061, filed May 7, 2012, entitled "Application Hosting in a Distributed Application Execution System," now U.S. Pat. No. 8,819,238, which is a continuation of U.S. patent application Ser. No. 13/212,142, filed Aug. 17, 2011, entitled "Application Server Scalability Through Runtime Restrictions Enforcement in a Distributed Application Execution System," now U.S. Pat. No. 8,195,798, which is a continuation of U.S. patent application Ser. No. 12/331,351, filed Dec. 9, 2008, entitled "Application Server Scalability Through Runtime Restrictions Enforcement in a Distributed Application Execution System," now U.S. Pat. No. 8,005,950, the disclosures of which are hereby incorporated herein by reference.

This application is related to U.S. patent application Ser. No. 12/060,798, filed Apr. 1, 2008, entitled "Efficient Hosting in a Distributed Application Execution System," now U.S. Pat. No. 7,877,482, which is incorporated by reference herein in its entirety.

TECHNICAL FIELD

The disclosed embodiments relate generally to methods and systems, sometimes called application servers, for hosting and executing large numbers of heterogeneous applications.

BACKGROUND

In general, increases in an application's popularity could present a variety of scalability problems that negatively impact a user's experience. For example, users could experience slower response times, slower page loading, and increased time outs on page requests. These scalability problems are typically alleviated by allocating additional capacity to the application such as more storage, more memory, more CPUs, and more machines in general.

Allocating or installing more computing capacity may be a reasonable solution when increases in an application's popularity are experienced over a prolonged period of time, or when usage of the application is predictable. Similarly, when an application experiences a decrease in usage, removing computing capacity previously allocated to the application may be a reasonable solution, especially when the decrease is experienced over a prolonged period of time, or when the decrease is predictable. However, the popularity of an application is often unpredictable, due to a variety of factors (e.g., time of day, current events, advertising, trends), and fluctuates to a large extent, which creates load spikes and dips in the application execution or hosting system.

Predefined allocations of computing resources are inefficient solutions for handling temporary load spikes and dips. Increasing or installing more computing resources to handle a load spike is inefficient, since the additional pre-allocated resources go unused when the spike disappears (e.g., when the spike in demand subsides, or the application's popularity dips). Similarly, decreasing computing resources allocated to an application when its popularity declines is also inefficient, since future usage spikes will require the re-allocation of previously removed resources back to the application.

To complicate matters further, application systems may host a large number of heterogeneous applications, each with its own set of fluctuating resource requirements. Pre-allocation of resources, for the reasons discussed above, is often an inefficient solution for ensuring consistent positive user experiences among heterogeneous applications hosted on an application system.

SUMMARY

In an application execution system having a plurality of application servers and an application master in an application execution system, the application master stores a plurality of applications, including a respective application, in a library for distribution among the application servers, adds a first instance of the respective application from the library to a respective application server for execution, and obtains usage information of one or more applications added to the application servers. In accordance with the usage information, the application master performs one of a predefined set of actions that includes: adding a second instance of the respective application to the plurality of application servers; and removing the first instance of the respective application from the respective application server.

BRIEF DESCRIPTION OF THE DRAWINGS

FIGS. 3B-3C is a flow diagram illustrating an exemplary runtime process for handling a request for an application in accordance with some embodiments of the invention.

Like reference numerals refer to corresponding parts throughout the several views of the drawings.

DESCRIPTION OF EMBODIMENTS

Figure 1:
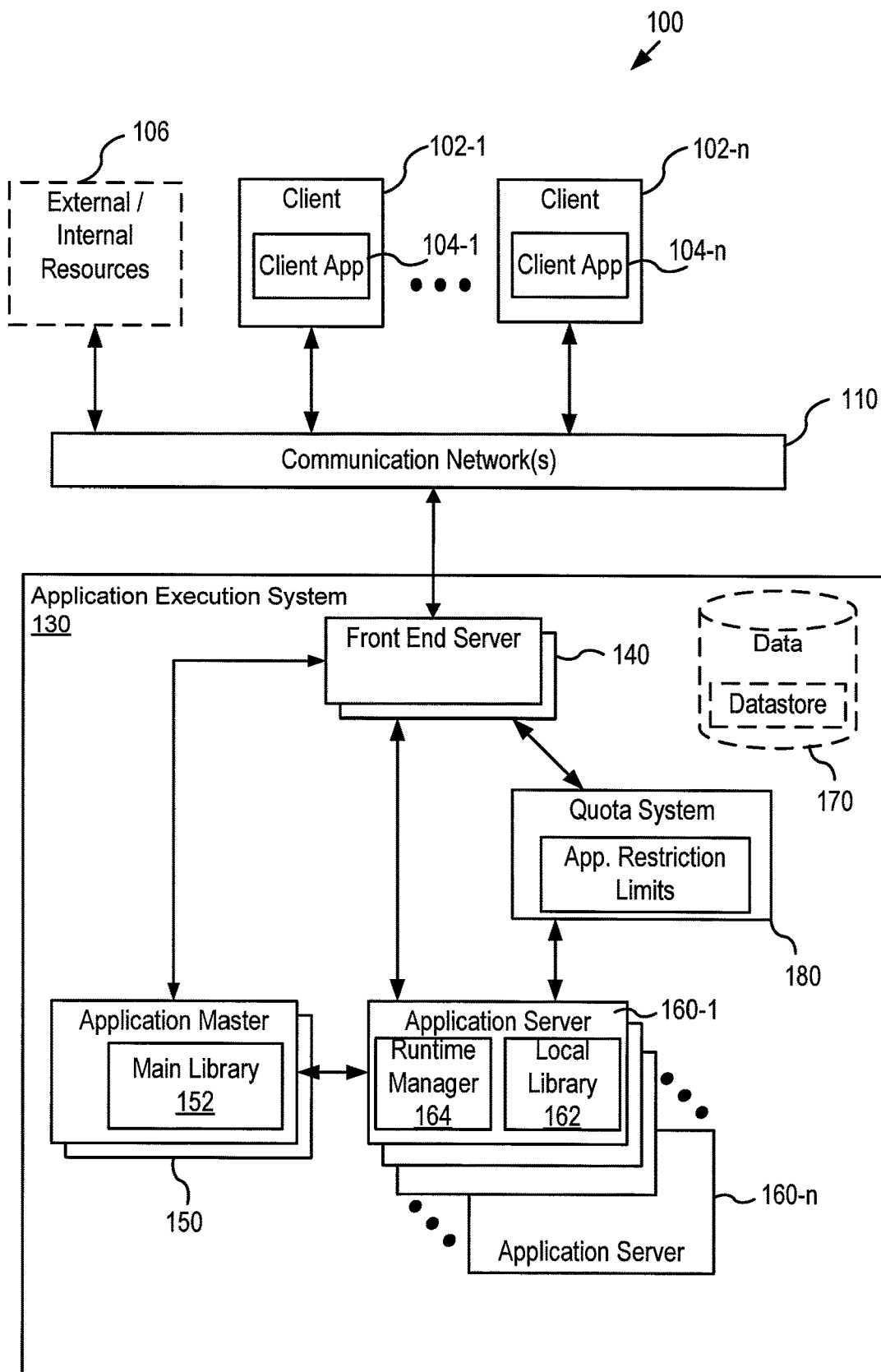
FIG. 1 is a block diagram of a distributed computing system including an application execution system according to some embodiments of the invention.

FIG. 1 is a block diagram of a distributed computing system 100 including an application execution system 130 connected to a plurality of clients 102 (e.g., 102-1 . . . 102-$n$) through a network 110 such as the Internet, other wide area networks, local area networks, metropolitan area networks, wireless networks, or any combination of such networks. In some embodiments, a respective client 102 contains one or more client applications 104 (e.g., 104-1 . . . 104-$n$), such as a web browser, for submitting application execution requests to the application execution system 130. The client 102 (sometimes called the "client device" or "client computer") may be any computer or similar device through which a user of the client 102 can submit requests to and receive results or services from the application execution system 130. Examples include, without limitation, desktop computers, notebook computers, tablet computers, mobile devices such as mobile phones, personal digital assistants, set-top boxes, or any combination of the above.

In some embodiments, the application execution system 130 include a front-end server 140, which receives application execution requests from clients 102 and returns results to the requesting clients. The front-end server 140 receives, from the application master 150, an application distribution map which may include resource usage information that can be used to route requests received from client(s) 102. More information regarding the application distribution map is provided in U.S. patent application Ser. No. 12/060,798, filed Apr. 1, 2008, entitled "Efficient Hosting in a Distributed Application Execution System" which is incorporated by reference herein in its entirety.

The application execution system 130 include a plurality of application servers 160 (e.g., 160-1 through 160-$n$). As described in more detail below with reference to FIG. 5, each of the application servers 160 includes non-volatile storage for storing a plurality of applications in a local library 162, volatile storage, and computational resources for executing applications in response to requests received by the application execution system 130. The application servers 160 may include a runtime manager 164, which as further discussed below with reference to FIGS. 2 and 3C, enforces resource limits and restrictions for various resources consumed by an application during execution. In some embodiments, the application execution system 130 includes a quota system 180 which, in conjunction with the runtime manager 164, implements a plurality of application restriction limits as further discussed below.

The application execution system 130 also includes an application master 150 that distributes applications, from a main library 152 having a plurality of applications, among the application servers 160. In the embodiment shown in FIG. 1, the main library 152 is stored in the application master 150. Alternately, the main library 152 may be stored remotely from the application master, such as in a datastore 170. In some embodiments, each application of the plurality of applications in the main library 152 is a web application that is responsive to HTTP requests. However, the present invention can also be used in non-web based environments, in which case the applications need not be web-based applications.

In some embodiments, the application execution system 130 also includes a datastore 170 accessible to at least the application master 150 and the front-end server 140, for sharing information about the location of applications among the application servers 160 and resource usage or loading information with respect to the application servers 160.

Optionally, the distributed system 100 includes additional resources 106, which may be located either internally or externally to the system 100, for use when executing applications in the application execution system 130. For example, an application executed by the application execution system 130 may access information in one or more of the additional resources 106 in order to process a request received from a respective client 102. These additional resources may include one or more of: other applications and data provided by web services (e.g., web feed data from sources such as blog entries, headlines, podcasts, etc.).

Figure 2:
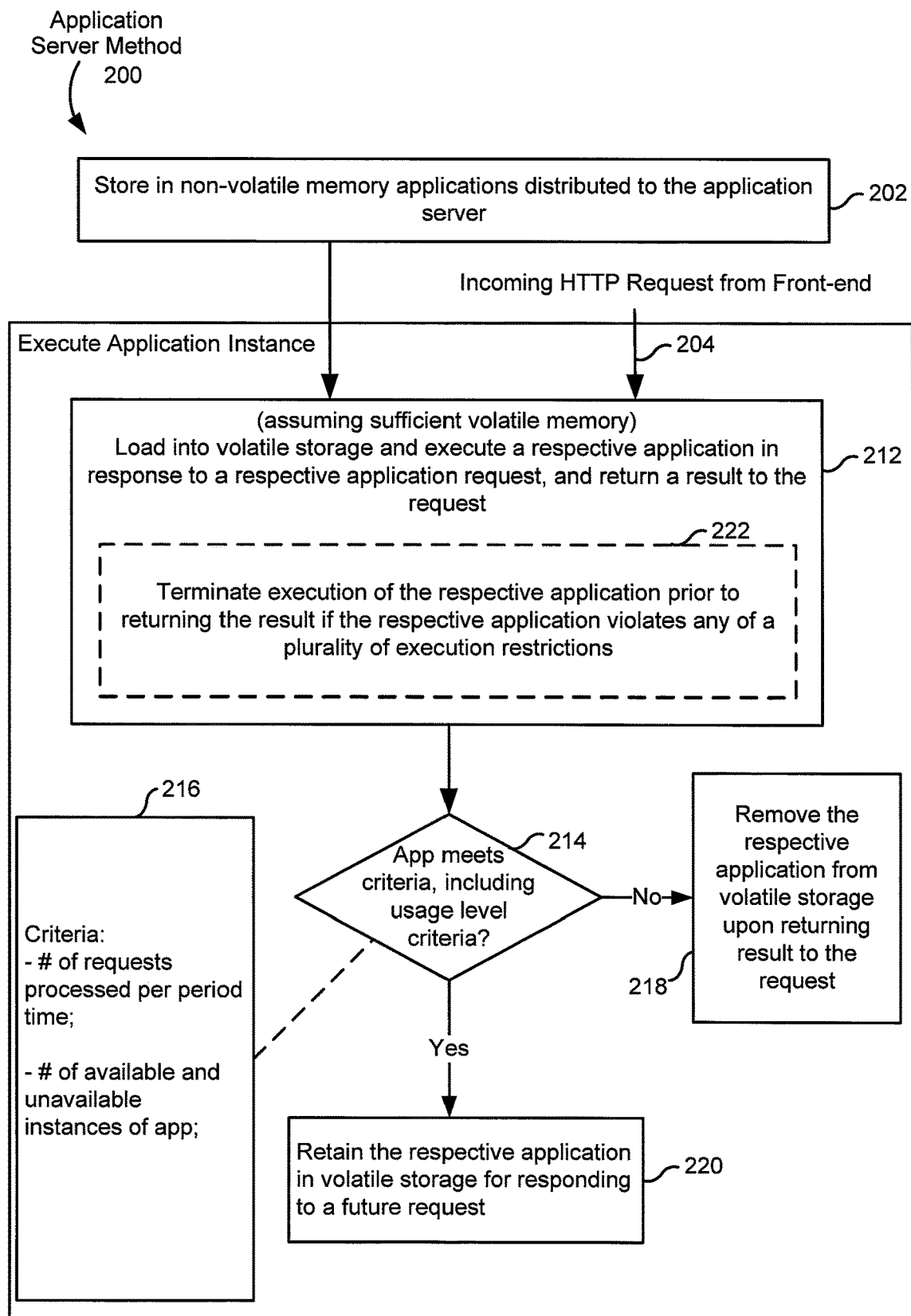
FIG. 2 is a flow diagram illustrating an exemplary method performed at an application server according to some embodiments of the invention.

FIG. 2 is a flow diagram illustrating a method 200 performed by an application server according to some embodiments. The applications distributed to the application server by the application master 150 are stored in the application server's non-volatile memory (202). Assuming that there is sufficient volatile memory, in response to an application request (204) from the front-end 140, the application server 160 loads the requested application into volatile storage, executes the requested application, and returns a result to the request (212). In some embodiments, the application servers prevent execution of the application if the application violates any of the execution restrictions further discussed below.

The application server may remove one or more applications from volatile memory before performing operation 212 when there is insufficient volatile memory to process the request. Alternatively, the application server may automatically remove applications from volatile memory when the amount of available volatile storage is below a predefined threshold.

In some embodiments, after returning the result to the request, the application server can either remove the respective application from volatile storage (218), or retain the respective application in volatile storage (220) for responding to future requests, by determining whether predefined criteria has been met (214). In some embodiments, the predefined criteria (216) used by the application server include usage level criteria, which may include the number of requests for the application processed per period of time. The predefined criteria may also include caching criteria, which may include the number of respective application instances in volatile storage available for handling new requests, and the number of respective application instances handling active requests and therefore not available for handling new requests. Cached application instances are discussed in more detail below with reference to FIG. 3A.

The predefined criteria may also include error criteria, which may be based on the number of errors encountered during execution of the application, and the type of errors encountered. For example, the application server may remove the respective application from volatile storage if severe errors are encountered during N (e.g., 5, 10 or 20) consecutive executions of the application.

For applications that fail to meet the predefined criteria (214-No), the application server removes the respective applications from volatile storage upon returning the result to the request (218). In some embodiments, the application server may remove the respective applications from volatile storage according to a predefined order for removal. For example, the application server may remove the least recently used application.

In some embodiments, when determining which application instance to remove from volatile storage, the application servers may take into account the service quality levels of the applications for which instances are stored in volatile memory. The service quality level of each application may be based on the level of service requested, or paid for. Various forms of preferences (for retention of application instances in volatile memory) may be given to applications with high service quality levels, compared to applications with lower service quality levels. For example, lower service quality level application instances may be evicted before higher service quality level application instances whenever a predefined condition is true. The predefined condition may relate to numbers or ratios of lower and higher service quality level application instances loaded in volatile memory. Alternately, scores may be computed to determine which application instances to unload from volatile memory, and computation of the scores may take into account the service quality levels of the applications.

For applications that meet the predefined criteria (214—Yes), the application server retains the respective applications in volatile storage for responding to future requests for the application (220). In some embodiments, the application server retains more than one application instance of the respective application in volatile storage in accordance with predefined caching criteria. In some embodiments, the application server limits the number of application instances in volatile storage. For example, the application server may limit the total number of application instances in volatile memory to ensure that there is sufficient volatile memory for other processing tasks. Alternatively, the application server may limit the number of instances of a respective application to ensure that other requested applications have access to sufficient volatile memory to service their requests.

In some embodiments, the application server may terminate (222) execution of the respective application prior to returning the result if the respective application violates any of a plurality of execution restrictions. These execution restrictions may include application resource limits for limiting an application's consumption of system resources during runtime (e.g., a response time limit, an average response time limit over multiple executions of an application, a volatile memory usage limit that limits the amount of volatile memory used by each execution of an application). In some embodiments, the same application resource limits are applied to all applications (e.g., the volatile memory usage limit is the same for all applications). Alternatively, the application resource limits may vary between applications. For example, the application execution system may terminate execution of the application if the application's run time or execution time exceeds the response time limit. Optionally, in embodiments where the average response time for an application is frequently or periodically updated, the application execution system may terminate execution of the application if the application's average response time exceeds the average response time limit (e.g., 0.5 seconds). For example, multiple instances (e.g., all instances being executed) of the same application may all be terminated if, for some reason, the average response time of the application extends beyond the applicable resource limit. The application execution system may also restrict the number of requests processed per period of time for an application, the number of CPU cycles per period of time, the stack size associated with the execution of an application, and other resource usage data as further discussed with reference to FIG. 4 (Resource Usage Data 434).

The execution restrictions may also prohibit certain actions performed by applications using one or more predefined application programming interfaces (APIs). These execution restrictions may restrict the use of non-volatile storage of the application server by an application during execution by preventing the application code from reading or accessing data stored in non-volatile storage. In addition the execution restrictions may govern the storage of state information by requiring state information (to be retained after returning the result) to either be sent to the client for storage, or retained in a datastore accessible by all application servers in the application execution system. Other execution restrictions may include restrictions on: opening network connections; creating new processes by an application, including the creation of threads by the application; making system calls by an application; and other system function calls. In some embodiments, to maintain scalability of the application execution system with respect to number of applications that can be executed and number of requests that can be processed per period of time, the execution restrictions include a restriction requiring all applications to execute within a secure execution environment. In these embodiments, external access to memory locations within the application servers is prohibited. The application execution system may also monitor and enforce restrictions on the frequency of certain actions performed by the applications that impact system performance by monitoring the frequency of calls (made by an application) to APIs associated with these restricted actions (e.g., number of times per period of time that the application calls the API(s) for accessing a datastore, number of times per period of time that the application calls the API(s) for accessing an external web service).

As previously discussed with reference to FIG. 1, in some embodiments, the application execution system includes a quota system 180. The monitoring and enforcement of certain execution restrictions described above may involve the quota system 180, which maintains aggregate quota information for each application. When an application needs to consume a system resource, the application execution system may consult the quota system to ensure that the application has not exceeded quota or threshold limits. For example, the system may include a restriction on the number of times per day the application can access the datastore (e.g., 2,000,000 calls per day) using the associated API (e.g., the Datastore Interface 572 FIG. 5). Before the application can call the Datastore Interface 572, the system checks the number of calls to the Datastore Interface 572 (made by a respective application on all application servers) to ensure that the application is still within its quota limit (e.g., 2,000,000 calls per day).

Figure 3A:
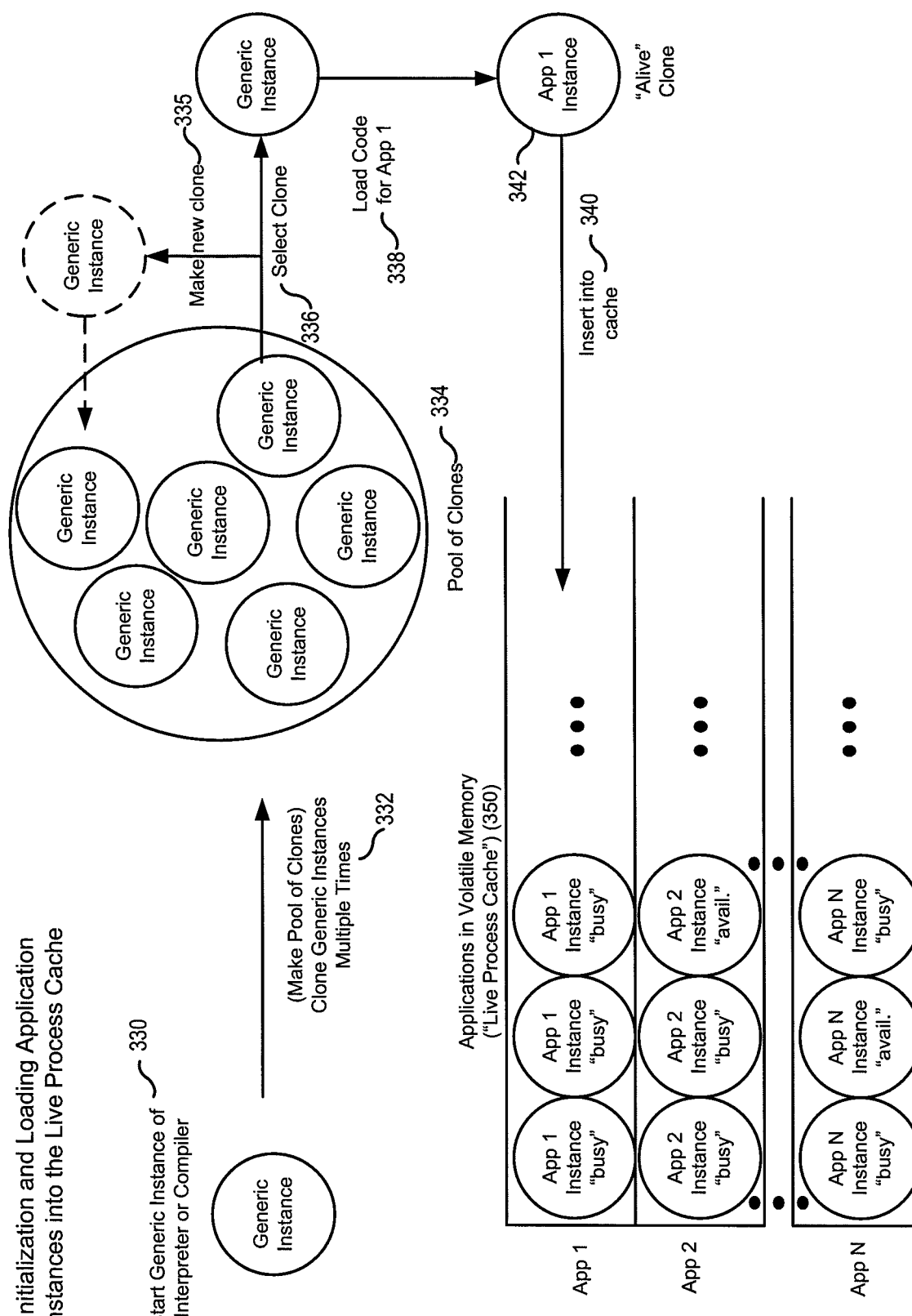
FIG. 3A is a conceptual diagram illustrating examples of initializing and loading application instances according to some embodiments of the invention.

FIG. 3A is a conceptual diagram of a process for managing application instances in volatile memory by the application server in accordance with some embodiments of the invention. The application servers actively manage application instances in volatile memory through a live process cache 350. The application server first initiates a generic application instance 330, sometimes called a "generic instance." The generic instance is "cloned" multiple times (332) resulting in a "pool of clones" (334) of the generic instance. When a request for an application is received, the application server removes (336) a generic instance clone from the "pool of clones" and loads (338) the code for the requested application into the generic instance clone to produce an application instance 342. In some embodiments, when a clone is removed from the "pool of clones," a request is issued (335) to create a new generic instance clone to replace the one selected. The code for the requested application may be associated with any of a variety of programming languages including but not limited to: Java, Perl, Python, or C. In some embodiments, the application is executed using an interpreter, while in other embodiments the application code is compiled and linked (as needed) with any other code (e.g., library procedures) to produce code that is ready for execution by the application server, in the context of the application server's operating system.

In FIG. 3A, the application server loads (338) the code for "App 1" into a generic instance in response to a request received for "App 1." The "App 1" instance may be referred to as "live" or "alive" since it contains code that is readily executable by the application server. The App 1 instance is loaded into a cache (e.g., "Live Process Cache") 350. The cache may contain other instances of App 1 as well as instances of other requested applications (e.g., App2 . . . AppN). These application instances in the Live Process Cache 350 are either "busy" or "available," although other transitional states could be used in addition in other embodiments. A "busy" application instance is one that is processing a current request, and therefore cannot process another incoming request until it finishes processing the current request. The "available" instances are ready to process any received request for the respective application.

Figure 3B:
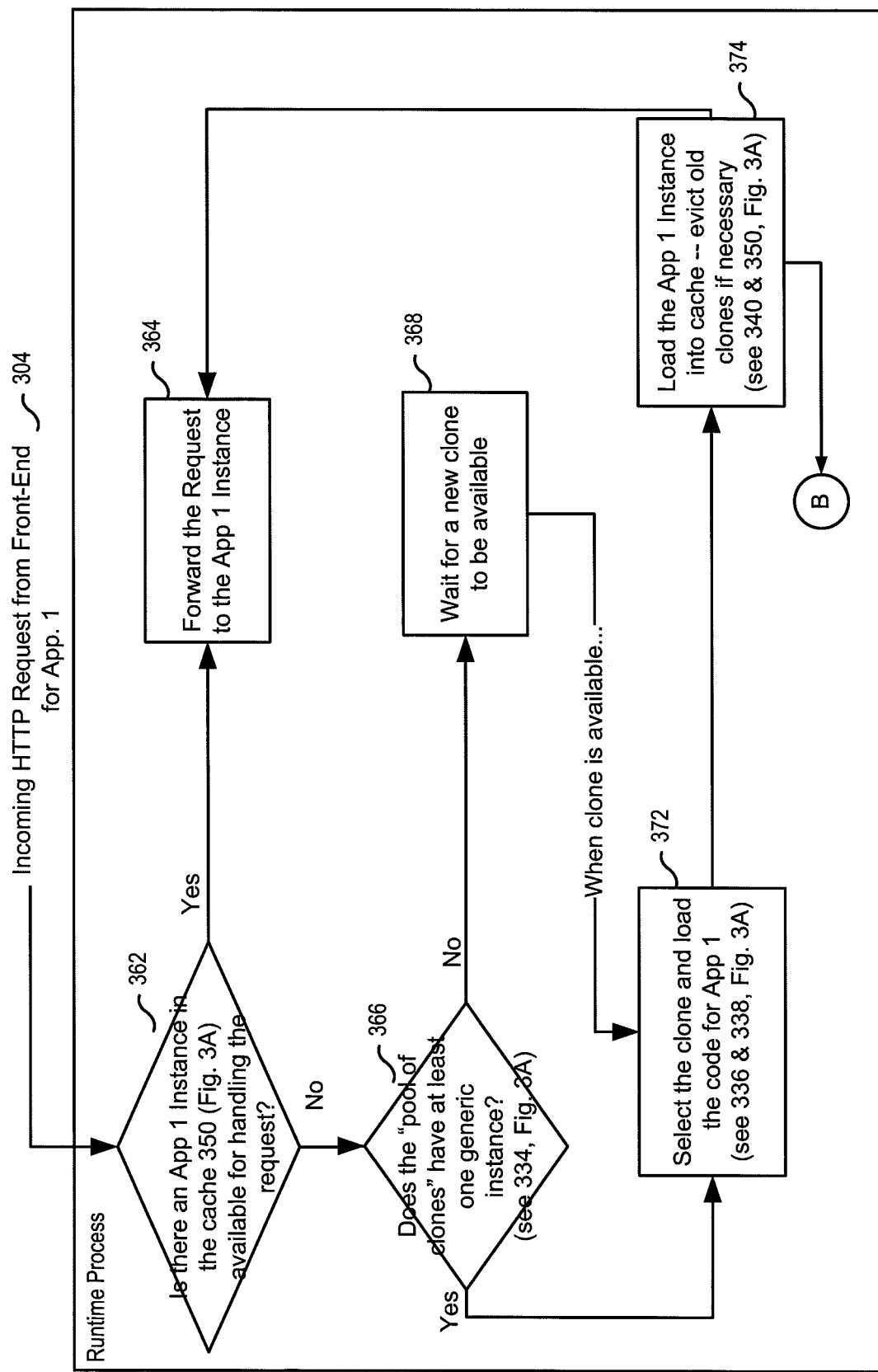

FIG. 3B-3C is a flow diagram illustrating an example of a runtime process for handling a request for an application at the application server in accordance with some embodiments. For the purposes of this example, it may be assumed that the application server has sufficient resources available to handle an incoming request to execute an application. Upon receiving (304) a request from the front-end for "App 1," the application server queries the cache 350 (FIG. 3A) for an available "App 1" instance for handling the request. If the cache returns an available "App 1" instance (362—Yes), the request is forwarded (364) to the returned instance for processing. If the cache does not return an available "App 1" instance (362—No), the application server determines (366) if the "pool of clones" 334 has at least one generic instance. Other application instances (e.g., the least recently used instance) are removed from the cache if necessary (e.g., to make room for new application instances). If there are no generic instances available (366—No), the process waits (368) for a generic instance clone to be available before performing operations (372) and (374). If there are generic instances available (366—Yes), a generic instance clone is selected (372) from the "pool of clones." The App 1 code is loaded (372) onto the selected generic instance, and the App 1 instance is loaded (374) into the live process cache 350. The App 1 instance is then executed (382) in volatile memory. During execution of App 1, a plurality of execution restrictions are monitored (384), such that the application server may terminate (388) execution of App 1 if one or more execution restrictions are violated (386—Y). In addition, upon termination of the application, the application server may return an error message to the requesting client. In some embodiments, application server also removes (392) the terminated App 1 instance from volatile storage (e.g., Live Process Cache 350). If no execution restrictions are violated (386-N) during execution of App 1, App 1 completes processing the request and returns (390) a result.

Figure 4:
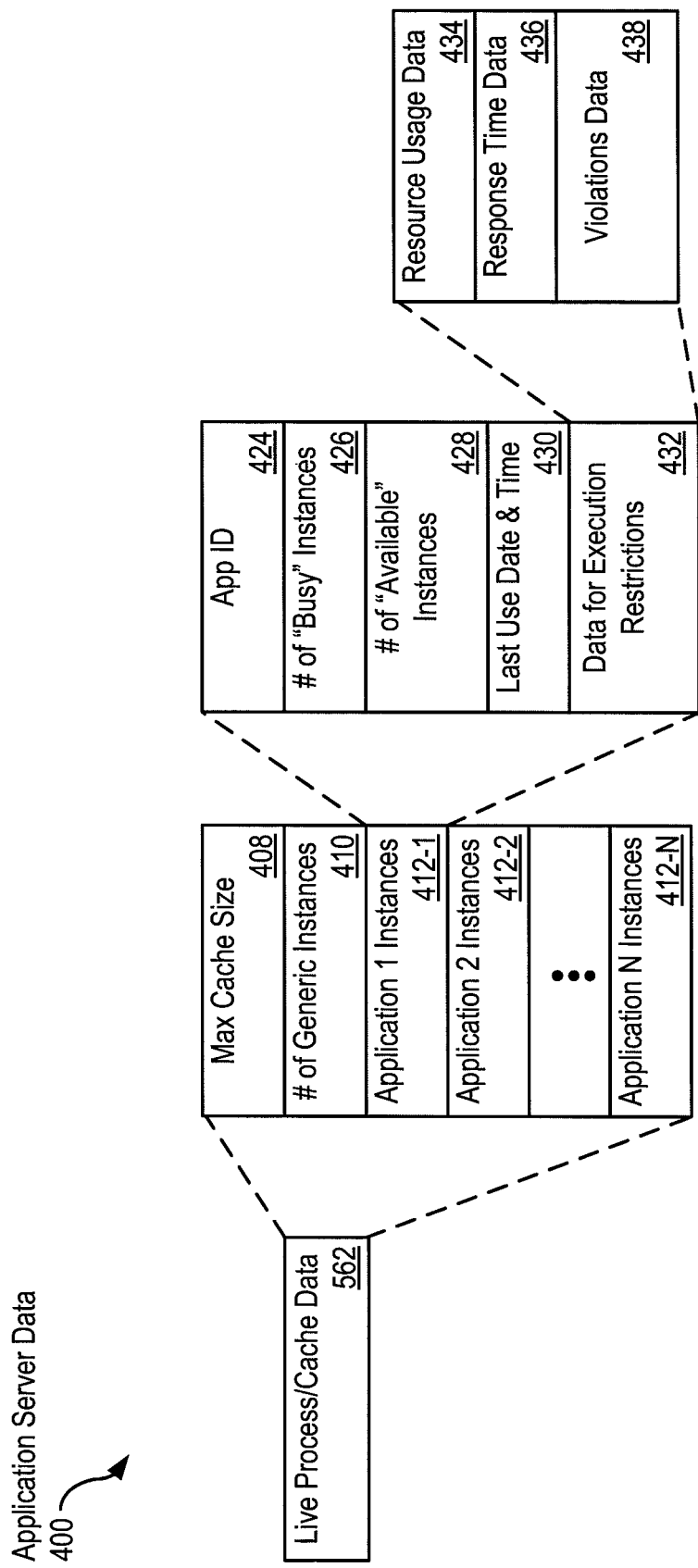
FIG. 4 is a block diagram illustrating a data structure for use by the application server for storing information relating to application instances in volatile memory in accordance with some embodiments of the invention.

FIG. 4 is a block diagram of a table or other data structure (live process ca cache data) 562 for storing information relating to application instances stored in volatile memory (e.g., Live Process Cache 350, FIG. 3A) for processing application requests in accordance with some embodiments of the invention. As shown in FIG. 4, live process cache data 562 includes the following items of information, or a subset or superset thereof:

cache size information 408, which may be represented (for example) in terms of memory capacity (e.g., a number of gigabytes), or a maximum number of application instances that can be stored in the live process cache 350;

the number of generic instances 410 currently available for allocation; and information 412 about each of the applications, or application instances, currently in the live process cache 350. For example, information 412 may indicate for each application having at least one instance in the live process cache 350, the identity 424 of the application, the number 426 of "busy" instances of the application, the number 428 of "available" instances of the application, last use information 430 (e.g., the date/time of last use of the application), and data for execution restrictions 432 or other information for enabling implementation of a cache eviction policy. Examples of execution restrictions data 432 including resource usage data 434, response time data 436, and violations data 438 are further described below.

Resource usage data 434, which allows the system to monitor the amount of system resources consumed by an application, may include any combination of the following (per period of time): number of CPU megacycles, number of HTTP requests, amount of bandwidth consumed by incoming requests for the application ("bandwidth in"), and amount of bandwidth consumed by transmission of outgoing results to requests for the application ("bandwidth out"). In addition, resource usage data 434 may also monitor the frequency of certain activities such as accessing a datastore, accessing internal or external application resources 106 (e.g., web services, web feeds, news feeds), and sending email from the application. These monitored activities are further discussed above with reference to FIG. 2.

Response time data 436 includes data indicating the amount of time it takes the application to issue a response to serve a request. Violations data 438 may include data indicating the frequency of restriction violations associated with the application (e.g., number of response time violations over a period of time, type of violated restriction(s), aggregate number of violations).

Figure 5:
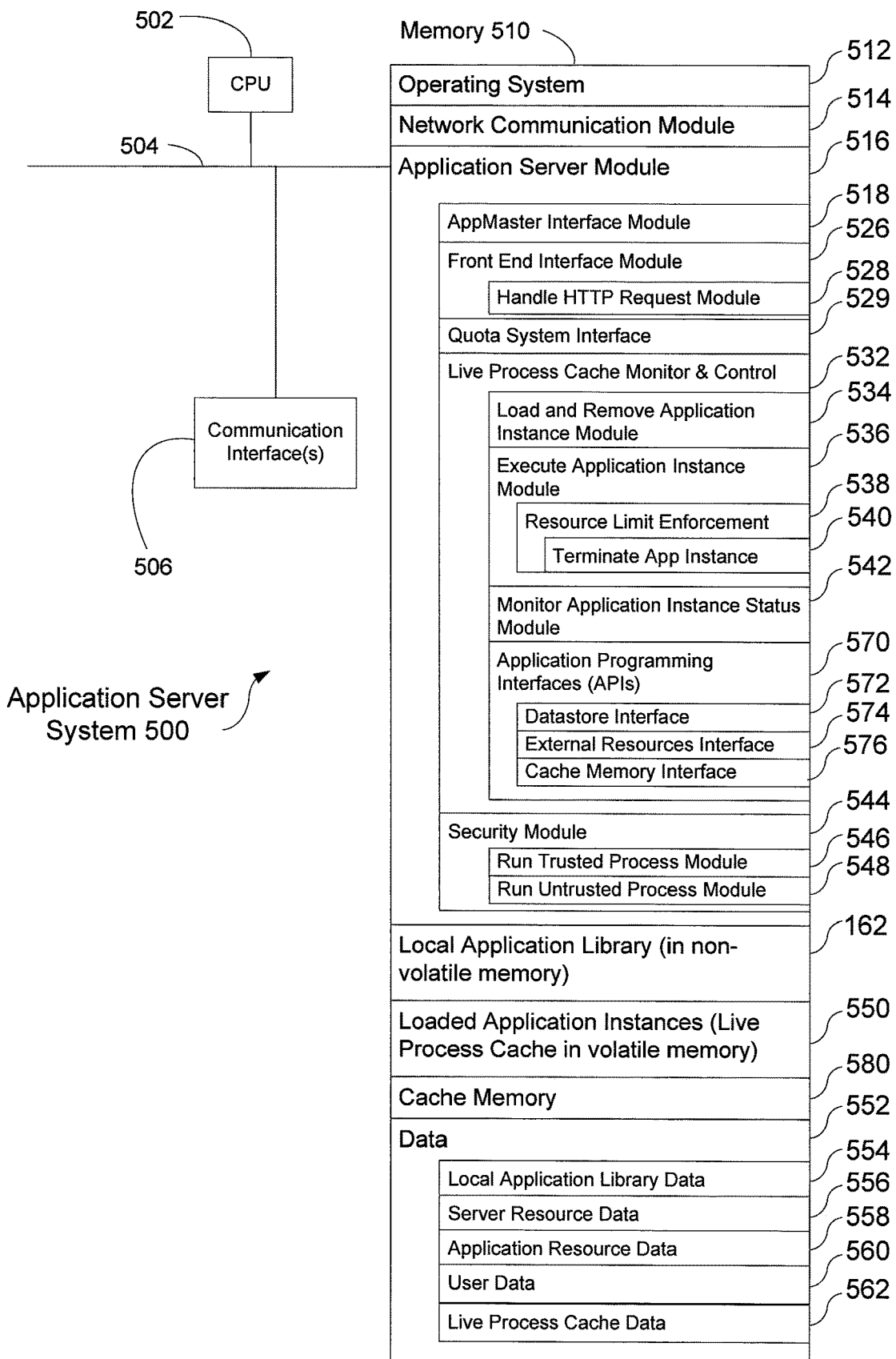
FIG. 5 is a block diagram of an application server in accordance with some embodiments of the invention.

FIG. 5 is a block diagram of an application server 500, which may implemented using one or more servers, in accordance with some embodiments of the invention. For ease of explanation, the application server 500 is herein described as implemented using a single server or other computer. The application server 500 generally includes one or more processing units (CPU's) 502, one or more network or other communications interfaces 506, memory 510, and one or more communication buses 504 for interconnecting these components. The communication buses 504 may include circuitry (sometimes called a chipset) that interconnects and controls communications between system components. Memory 510 may include high speed random access memory and may also include non-volatile memory, such as one or more magnetic disk storage devices. Memory 510 may include mass storage (e.g., datastore 170, FIG. 1) that is remotely located from the central processing unit(s) 502. Memory 510, or alternately the non-volatile memory device(s) within Memory 510, comprises a computer readable storage medium. In some embodiments, Memory 510 stores the following programs, modules and data structures, or a subset thereof:

- an operating system 512 that includes procedures for handling various basic system services and for performing hardware dependent tasks;
- a network communication module 514 that is used for connecting the application server 500 to other computers via the one or more communication network interfaces 506 (wired or wireless) and one or more communication networks (e.g., communication networks 110), such as the Internet, other wide area networks, local area networks, metropolitan area networks, and the like;
- an application server module 516 for processing application requests. In some embodiments, the application server module 516 includes an application master interface module 518 for interfacing with the application master 150 (FIG. 1), a front-end interface module for interfacing with the front-end 140, a quota system interface module 529 for interfacing with the quota system 180, and a live process cache monitor and control module 532 for managing application instances in the live process cache 350 (FIG. 3A). The application server module 516 may also store a security module 544 for executing untrusted processes (Run Untrusted Process Module) 548 and trusted processes (Run Trusted Process Module) 546. Some of the procedures included in the application server module 516 are further described below.
- a local application library 162, for storing the applications distributed to the application server by the application master 150;
- application instances in volatile memory 550 (e.g., in a live process cache 350, FIG. 3A) for servicing application requests. In some embodiments, there is at least one application instance for an application in volatile memory;
- data 552 includes data used primarily by the application master 150 (e.g., local application library data 554, server resource data 556, application resource data 558). More information regarding data used by the application master is provided in U.S. patent application Ser. No. 12/060,798, filed, Apr. 1, 2008, entitled "Efficient Hosting in a Distributed Application Execution System" which is incorporated by reference herein in its entirety. When needed, data 552 includes user data 560, which may include data received from a requesting user (e.g., user name, passwords, user preferences, profiling information) and/or data produced or retrieved for the requesting user by the application server. In addition, data 552 may include live process cache data 562, described with reference to FIG. 4;
- an optional Cache Memory 580, for temporarily storing data and making the data for a respective application accessible to all instances of that application.

In some embodiments, the application master interface module 518 includes procedures for adding or removing applications from the non-volatile storage of the application server. The application master interface module 518 may also include procedures for sending usage information on application resources and server resources to the application master. In some embodiments, the front end interface module 526 includes procedures for handling application requests 528 forwarded from the front end 140. More information regarding the application master and the front-end is provided in U.S. patent application Ser. No. 12/060,798, filed, Apr. 1, 2008, entitled "Efficient Hosting in a Distributed Application Execution System" which is incorporated by reference herein in its entirety.

Procedure(s) (Live Process Cache Monitor & Control) 532 for managing application instances in the live process cache 350 may include procedures (Load and Remove Application Instance Module) 534 for loading and removing application instances into the live process cache in accordance with application usage and available volatile memory as previously discussed with reference to FIG. 2, procedures (Execute Application Instance Module) 536 for executing application instances when processing application requests. The Execute Application Instance Module 536 may also include procedures (Resource Limit Enforcement) 538 for limiting resource consumption of a particular application. For example, an application that consumes more resources than a limit or threshold may be terminated (Terminate App Instance) 540, as previously described with reference to FIG. 2. The resource limit may be a predefined amount or the threshold may vary depending on factors such as the number of requests for the application. For example, applications that receive higher numbers of requests may have a higher threshold before the application instance is terminated. Alternatively, the threshold may also depend on the amount of processing resources (e.g., one or more of: CPU time, "wall clock" time (i.e., total elapsed real time), memory, communication bandwidth, and number of system function calls made) consumed by the application. The threshold(s) may be applied per execution of an application, or to a running average of resources used over multiple executions of the application. An application instance that consumes resources above a corresponding threshold may be terminated.

The procedures (Live Process Cache Monitor & Control) 532 may also include application programming interfaces (APIs) 570 that enable and restrict activities that applications may engage in during execution. The APIs 570 may include any combination of the following: a Datastore Interface 572 for interfacing with a datastore (e.g., the datastore 170); a Cache Memory Interface 576 for interfacing with shared Cache Memory 580; and an External Resources Interface 574 for interfacing with external resources (e.g., other applications, other websites, web services). In embodiments having the Cache Memory 580 and the Cache Memory Interface 576, an application instance can store data (e.g., data copied from a datastore) for high speed access by all instances of the same application. The application must not rely upon retention of data by the Cache Memory 580; for example, the data stored in the Cache Memory 580 for a respective application may be deleted whenever there are no longer any active instances of the application. The Datastore and Cache Memory mechanisms for sharing information between instances of the same application are accessibly only through the APIs provided by the application execution system, which facilitates enforcement of application restrictions associated with both durable and temporary storage of data that can be shared between application instances.

The live process cache monitor & control module 532 may also include procedures for monitoring the status of application instances (Monitor Application Instance Status Module) 542. For example, the status of the application instances may be "busy," "available," or any transitional state in between (see FIG. 3A).

FIG. 5 shows an application server system and is intended more as functional descriptions of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement each such subsystem and how features are allocated among them will vary from one implementation to another, and may depend in part on the amount of data traffic that the system must handle during peak usage periods as well as during average usage periods.

Each of the above identified elements in FIG. 5 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 510 may store a subset of the modules and data structures identified above. Furthermore, Memory 510 may store additional modules and data structures not described above.

Figure 6A:
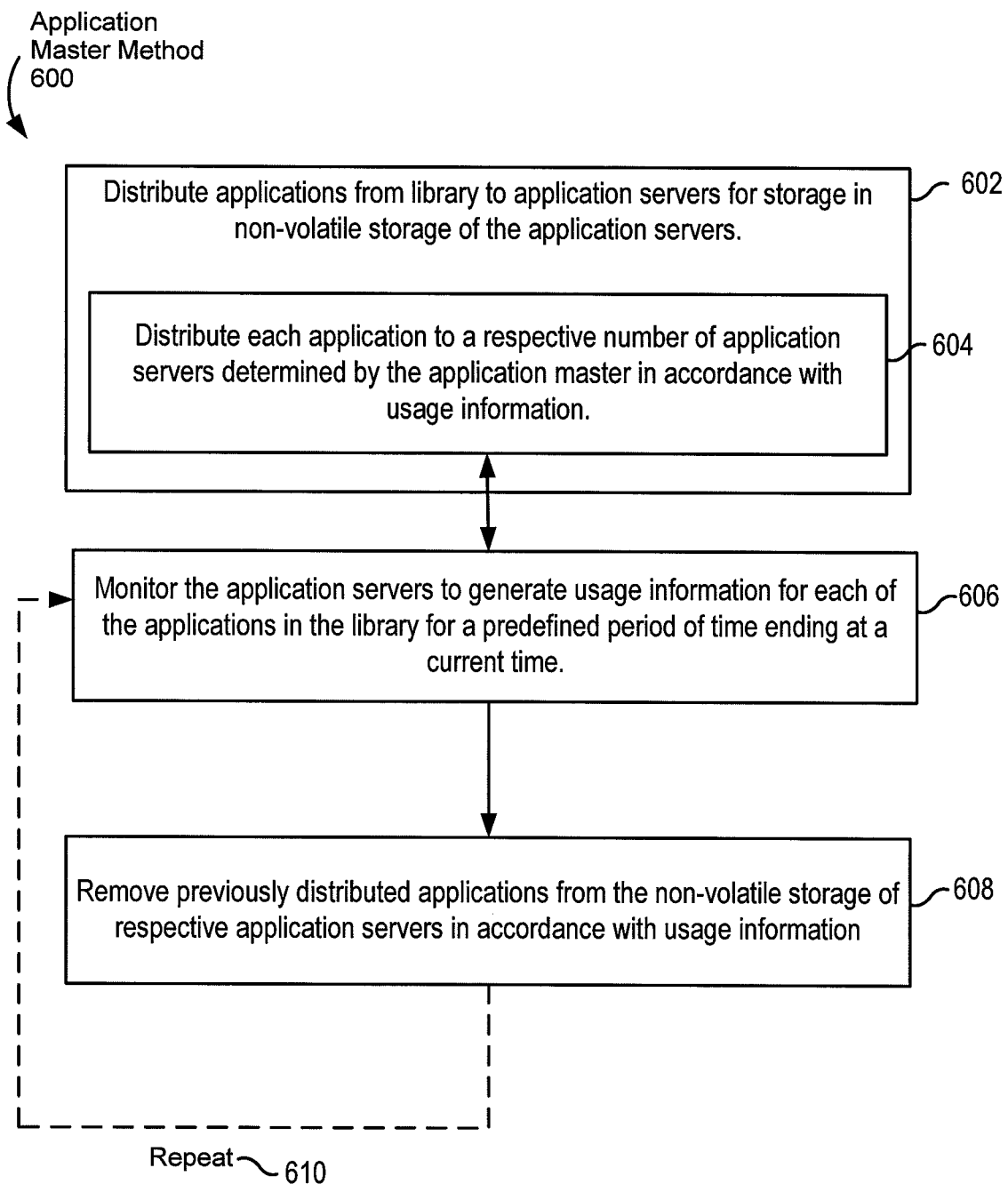
FIG. 6A is a flow diagram illustrating examples of distribution, monitoring, removal, and addition processes according to certain embodiments.

FIG. 6A is a flow diagram illustrating a method 600 performed by an application master according to certain embodiments of the invention. The application master distributes (602) applications from the main library 152 (FIG. 1) to the application servers 160 for storage in the non-volatile storage (i.e., local library 162) of the application servers 160. As described in more detail below with reference to FIG. 6B, each application from the library is distributed by the application master 150 to a respective number of the application servers 160 that is determined by the application master in accordance with usage information for the application (604). Thus, applications in heavy use are typically distributed to more application servers than applications receiving less use. The method 600 further includes monitoring (606) the application servers 160 to generate usage information for each of the applications in the library for a predefined period of time ending at a current time, and removing (608) previously distributed applications from the non-volatile storage of respective application servers 160 in accordance with the usage information. Typically, the distributing, monitoring and removing operations are repeated (610), or are ongoing, so long as the system continues to operate.

Figure 6B:
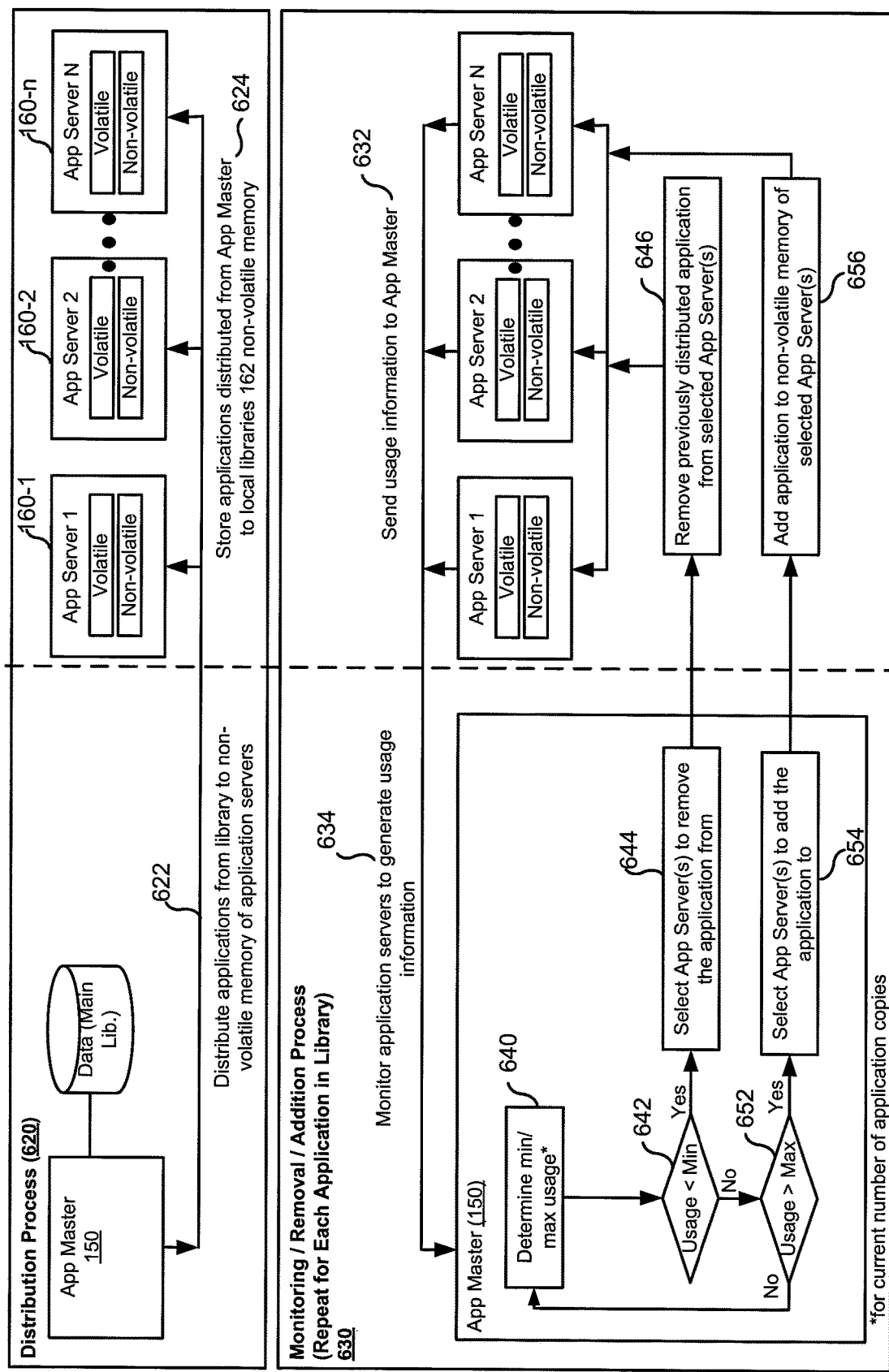
FIG. 6B is a flow diagram illustrating examples of distribution, monitoring, removal, and addition processes according to certain embodiments.

FIG. 6B is a more detailed flowchart of a method 600 described above with reference to FIG. 6A. The top portion of FIG. 2B is a schematic view of a distribution process 620 in which the application master 150 distributes (622) applications from the main library 152 to application servers 160 for storage in non-volatile storage. Each of the application servers 160 stores (624) in its non-volatile storage the applications distributed to it by the application master. In some embodiments, the application master 150 distributes each application in the main library 152 to at least three of the application servers 160. The minimum number of application servers to which each application is distributed is selected in order to ensure at least a predefined minimum level of service for every application in the main library.

The application servers send (632) application usage information to the application master, and the application master monitors (634) the application servers to generate usage information for each of the applications in the library for a predefined period of time. From the generated usage information, the application master 150 can evaluate usage of each application (e.g., frequency of usage, resources used, etc.), and can also evaluate the loading of each application server. In some embodiments, the usage information (e.g., CPU usage information 752, FIG. 7B) and information about the amount of storage available at a respective application server (e.g., server storage data 756, FIG. 7B) used by the application master to determine the load on an application server are stored in a data structure 740, described below with reference to FIG. 7B. Information about the CPU usage of a respective application (e.g., CPU usage 726, FIG. 7A), used by the application master to determine the usage level of the application, is stored in a data structure 700, described below with reference to FIG. 7A.

As described in more detail below, the application master 150 evaluates the usage information according to pre-defined criteria, and takes appropriate action by increasing or decreasing the number of application servers to which each application has been distributed, to ensure that sufficient resources are available to service client requests for execution of the applications. In some embodiments, the application distribution process by the application master, as applied to each application in the library, includes evaluating usage level thresholds for the application based on the number of active application servers to which the application has been distributed. For example, minimum and maximum thresholds are determined, which indicate a suitable range of application usage (over a predefined period of time) for the number of application servers on which the application is stored. If the usage level is below the minimum usage threshold (642—Yes), the application master 150 removes the application from a selected set of the application servers (644). Upon receiving application removal instructions from the application master, the selected application servers remove the application from their non-volatile storage (646).

If the usage level is above the maximum threshold (652—Yes), the application master 150 distributes (654) additional copies of the application from the main library to a selected set of the application servers. The selected application servers store (656) the application in their local libraries 162 (FIG. 1) in non-volatile memory. In some embodiments, while performing operations 644 and 654 the application master manages the load on a respective application server, in accordance with predefined load distribution criteria, by distributing applications to and removing applications from the non-volatile storage of the respective application server. More generally, the application master takes into account the current application execution loads on the application servers when determining the applications servers to send additional applications and the applications servers from which to remove applications.

Occasionally, application server(s) may need to be removed (or taken offline) from a cluster for repairs, routine maintenance, and other reasons. In these situations, the application master 150 may transfer load handled by the application server(s) to be removed and redistribute this load across remaining active application servers. The process of transferring load to the active servers may be rate-limited so that application servers can be safely removed after a period of time without disrupting the system.

In some embodiments, the removing of previously distributed applications from the non-volatile storage of the application servers and the distributing of applications from the library to the application servers are rate limited with respect to how many applications are removed and distributed per predefined period of time. A rate limit (e.g., a limit of N applications per unit of time) may be applied to each application server individually, or to a cluster or other group of application servers. In some embodiments, the rate limit is set small enough so that changes in the load pattern of an application server occur slowly, rather than all at once, which allows the application master to make other changes to account for the load. The load increase that will be caused by adding a new application to a server is unknown. It may cause a large increase in load on the server, or it may have no effect. By rate limiting how many applications are added (or removed) from an application server, the system is given more time to adjust to changes in loads caused by the additions or removals.

Figure 7A:
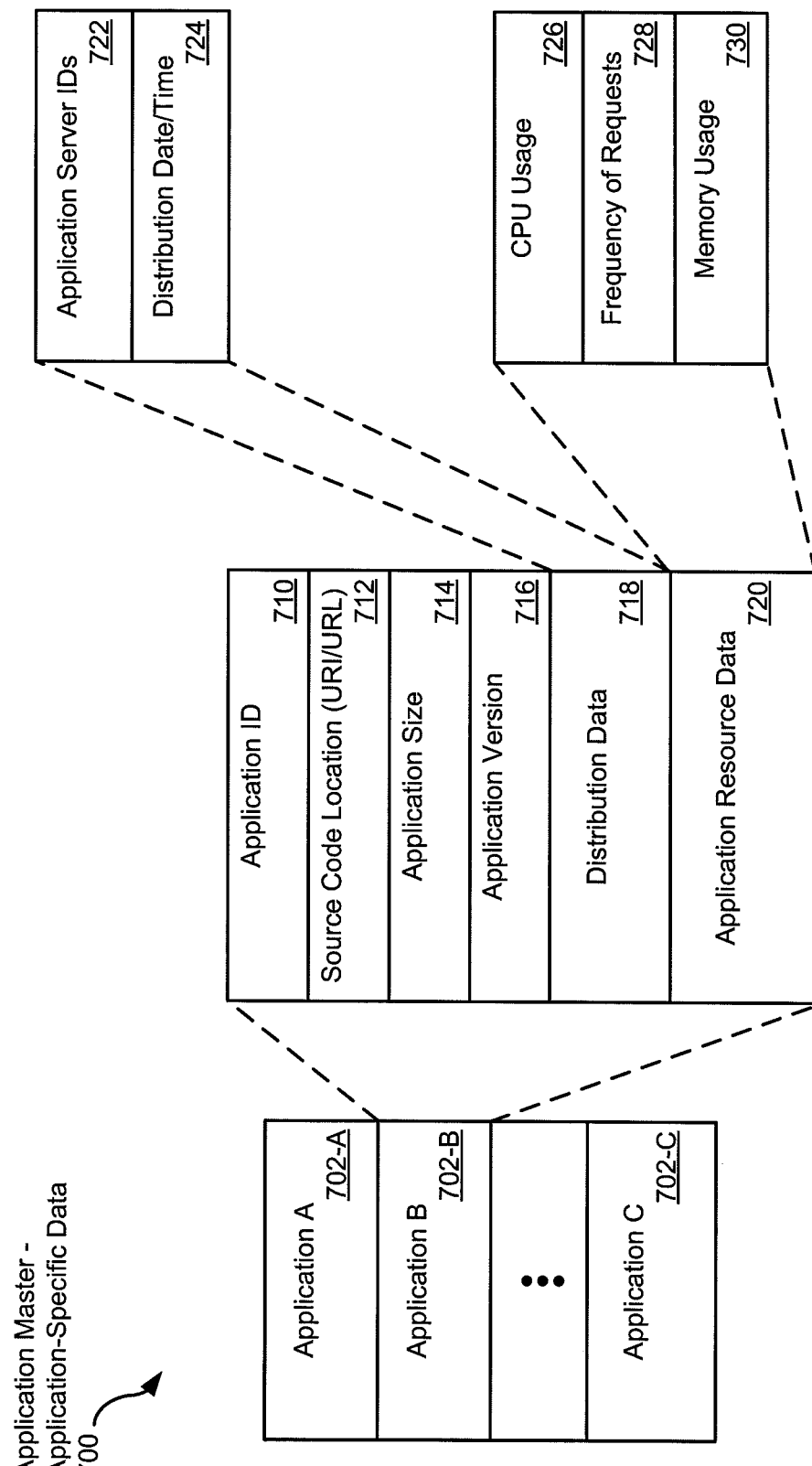
FIG. 7A represents a data structure used by an application master to store information regarding a set of applications that have been distributed to a set of application servers in accordance with some embodiments.
Figure 7B:
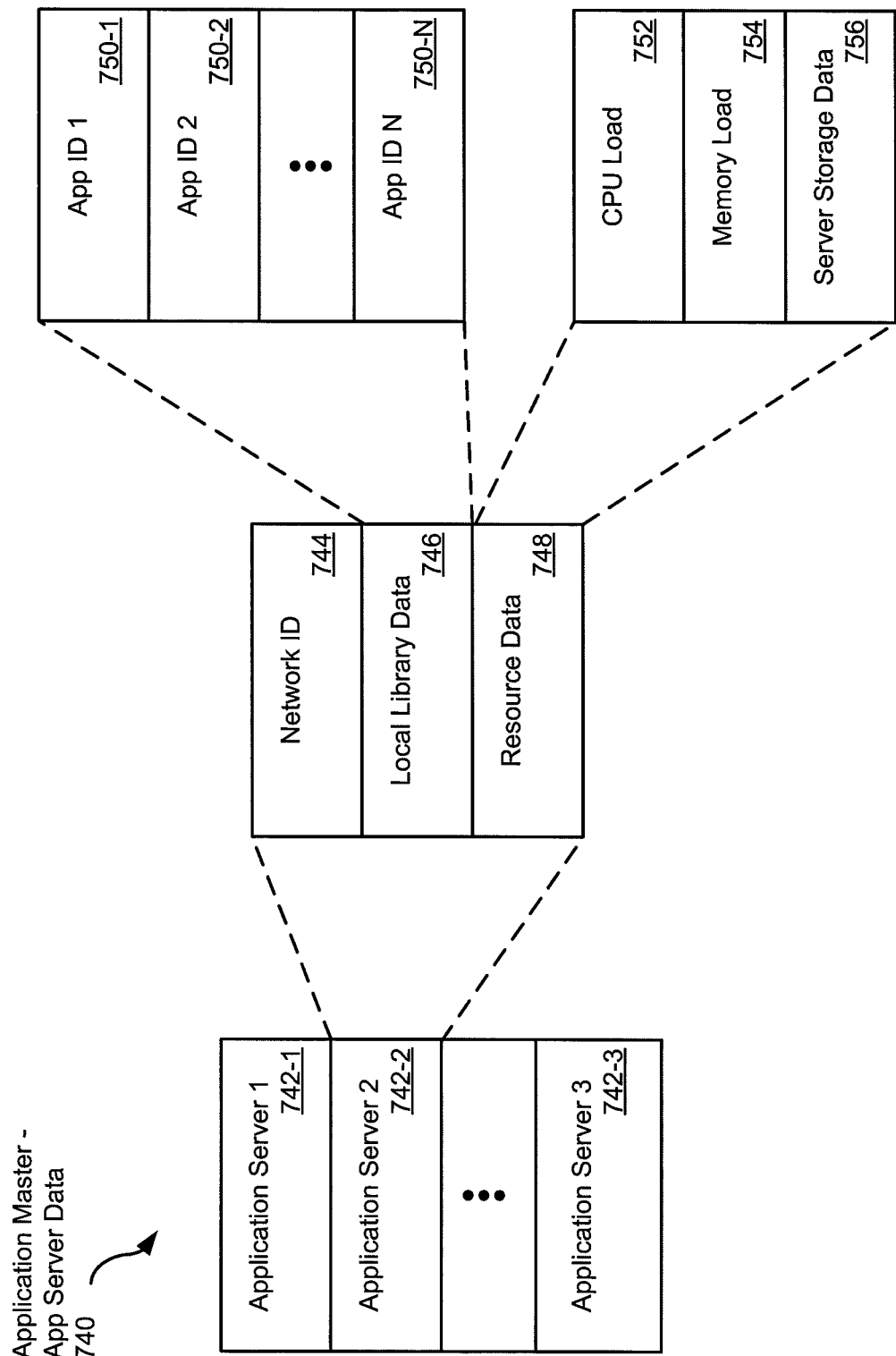
FIG. 7B illustrates a data structure used by an application master to store information concerning a set of application servers to which a set of applications have been distributed in accordance with some embodiments.
Figure 7C:
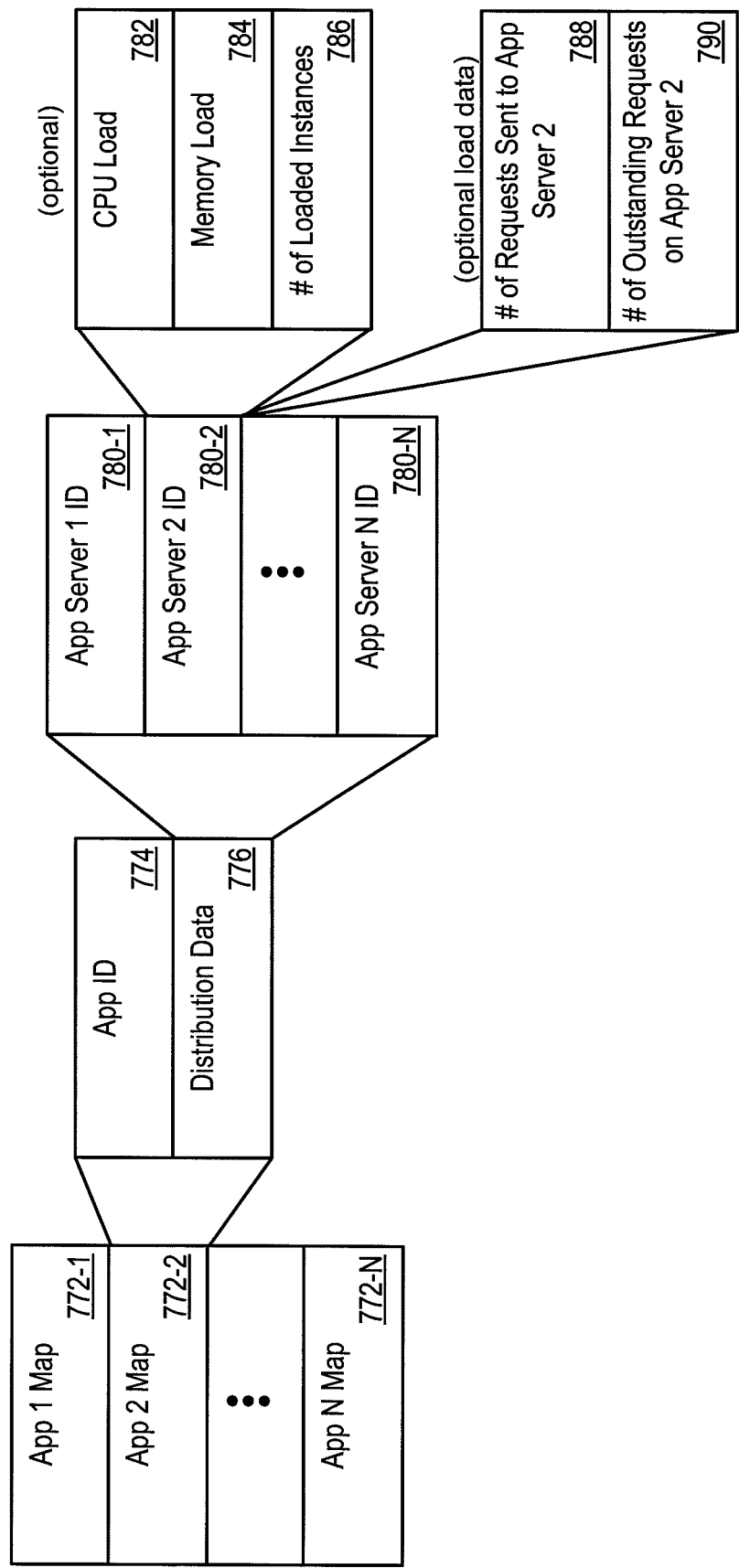
FIG. 7C illustrates a data structure used by a front-end server to route application processing requests to application servers in accordance with some embodiments.

FIGS. 7A-7C are examples of data structures that may be used by the application master 150 to monitor resource usage at the application servers 160. FIG. 7A is a block diagram of a table or other data structure 700 storing information about each of the applications in the main library 152. Alternately, the data structure 700 includes information for a subset of the applications, such as active applications that have been distributed to application servers. The data structure 700 includes a respective record 702 for each application for which information is stored. In some embodiments, the record 702 is maintained by the application master 150 and stores the information specific to the application (e.g., record 702-B for Application B) including:
  a unique application identifier (application ID) 710;
  the location of the application's source code (Source Code Location) 712;
  the storage size of the application 714;
  a version identifier for the application 716;
  distribution data 718 identifying application servers that have a copy of the application in their local libraries; and
  application resource data 720, which includes information about the resources consumed by the application.
In some embodiments, the distribution data 718 includes:
  information identifying the application servers that contain the respective application (e.g., Application Server IDs) 722; and
  optionally, dates and times showing when the respective application was distributed to the identified application servers (Distribution Date/Time) 724.

In some embodiments, the application resource data 720 for a particular application includes one or more of the following fields: CPU usage information 726, indicating an amount of CPU usage over a predefined period of time, or per execution, or other statistics (e.g., minimum, maximum, average, mean, standard deviation) relating to CPU usage by the application; frequency of requests 728, indicating a number of executions of the application per predefined period of time, or other statistics relating to the frequency of requests for the application; and memory usage 730, indicating the amount of memory used during execution of the application, or other statistics relating to memory usage by the application. It is noted that the fields of the data structure 700 described above are examples of information stored by the application master. In other embodiments, the application master 150 may store a subset of these fields, and may optionally store additional information about the applications in the master library 152. Furthermore, the information represented here as being stored in data structure 700 may be organized in other ways, for example divided over multiple data structures, in other embodiments of the invention.

FIG. 7B is a block diagram of a table or other data structure 740 storing information about each of the application servers 160 in the application execution system 130. Alternately, the data structure 740 includes information for a subset of the application servers, such as active application servers serviced by the application master. The data structure 740 includes a respective record 742 for each application server for which information is stored. In some embodiments, the record 742 is maintained by the application master 150 and stores the information specific to the application server (e.g., record 742-2 for Application Server 2), including:
  a unique identifier 744 (e.g., network ID) for the application server, for example an identifier that indicates or that can be used to find the server's location on the network;
  local library data 746 identifying the specific applications installed on the application server's local library; and
  resource data 748 indicating the amount of resources used by the application.
    i. The local library data 746 includes information (e.g., application identifiers 750) identifying the applications installed on the application server. Optionally, local library data 746 includes additional information, such as distribution date information or version information for the listed applications. The information in the local library data 746 for a respective application server is received from that application server, and may be stored at the application server either as a distinct data structure, or together with the local application library itself, or in combination with other information retained by the application server.

The resource data 748 may include information on the CPU load 752 of the application server (e.g., statistics, such as average, mean, minimum, maximum, standard deviation, etc.) over a predefined period of time, memory load 754 of the application server (e.g., statistics of volatile memory usage over a redefined period) from which the application master can determine the amount of memory used and available on the application server, and server storage data 756 (e.g., non-volatile storage available, storage used, etc.) from which the application master can determine the amount of non-volatile storage available on the application server. It is noted that the fields of the data structure 740 described above are examples of information stored by the application master. In other embodiments, the application master may store a subset of these fields, and may optionally store additional information about the application servers in the application execution system 130. Furthermore, the information represented here as being stored in data structure 740 may be organized in other ways, for example divided over multiple data structures, in other embodiments of the invention.

FIG. 7C is a block diagram of a table or other data structure 770 used by a front-end server 140 to route application processing requests to application servers 160. In accordance with some embodiments, the application master 150 (FIG. 1) generates distribution data identifying which of the applications are present in the non-volatile storage of each of the application servers, and the one or more front end servers 140 of the application execution system 130 route requests to the application servers in accordance with the distribution data. In some embodiments, the front end servers 140 route requests to the application servers based on load data collected from the application servers. In the example shown in FIG. 7C, the distribution data, and optionally other information that can be used for determining the application server to which a respective application execution request should be routed, is stored in a data structure 770 such as the one shown in FIG. 7C.

The data structure 770 stores a respective record 772 for each application to which the front-end 140 may need to route application execution requests. This record 772 may be called an application distribution map. In some embodiments, the record 772 for a respective application includes the following information: an identifier 774 of the application, and distribution data 776 for the application. The distribution data 776 includes a list of identifiers 780 or other information identifying the application servers that have a copy of the application in their local libraries. Optionally, the distribution data 776 includes resource information associated with respective application at each of the identified application servers, such as one or more of: CPU load information 782, memory load information 784, and the number of loaded instances 786 of the application at the respective application server (the loading of application instances in volatile memory is described in more detail below). It is noted that the fields of the data structure 770 described above are examples of information stored by the application master. In other embodiments, the application master 150 may store a subset of these fields, and may optionally store additional information about the distribution of applications in the application execution system 130. Furthermore, the information represented here as being stored in data structure 770 may be organized in other ways, for example divided over multiple data structures, in other embodiments of the invention. Two examples of additional information that may optionally be included in the resource data 770 (or 748, FIG. 7B) for a particular application server are: the number of (application execution) requests 788 that have been sent to the application server over a defined period of time (e.g., an hour), and/or the number of outstanding (or queued) requests 790 that are pending at the application server. The resource data 770 (or 748), stored by the front-end for a respective application server may comprise averages or running averages of resource usage by the applications being executed by the respective application server.

The front end server 140 receives the application distribution map 770 from the application master 150. As noted above, the application distribution map 770 optionally includes resource usage information that can be used to route requests received from client(s) 102. For example, upon receiving a request from a client to execute a specified application, the front end server 140 accesses the corresponding record 772 (of application distribution map 770) for the specified application to determine the application servers that have copies of the application. In some embodiments, the front end server 140 routes such requests using a round robin methodology (e.g., in round robin order within the list of application servers in the record 772 for the application), or a random assignment methodology (e.g., randomly or pseudo-randomly among the application servers listed in record 772).

In some other embodiments, the front end server 140 routes requests based on current and historical load information that the front end server has observed directly. Two load metrics that the front end server 140 can observe directly are the number of application execution requests that the front end server 140 has recently sent to each application server, and the number of currently outstanding application execution requests at each application server (e.g., the number of recent application execution requests sent to each application server which have yet to return results or a signal of completion). It is noted that the number of pending application execution requests (also called currently outstanding application execution requests) is a latency metric, and thus measures performance from the perspective of the system's users. Using this information, which may be observed and stored by the front end server 140, the front end server 140 may route application requests. For example, the front end server 140 may route a request to the application server that (A) has a copy of the requested application, and (B) the least number of outstanding requests. In another example, the front end server 140 may route a request to the application server that (A) has a copy of the requested application, and (B) the least number of outstanding requests for the requested application.

Alternately, the front end server 140 accesses resource information associated with the application servers that have copies of the application, and uses that information to route the request. For example, the front end server 140 may select an application server have the lowest load (e.g., CPU load, memory load, or a predefined combination thereof), or a load below a predefined threshold. Alternately, the front end server 140 may take into account the number of instances of the application already loaded in the volatile memory of each of the listed application servers, and may favor sending the request to an application server having one or more loaded instances of the application so long as predefined the server also meets predefined load criteria (e.g., a load level below a threshold, a load lower than other application servers having one or more loaded instances of the application, or the like).

Figure 8:
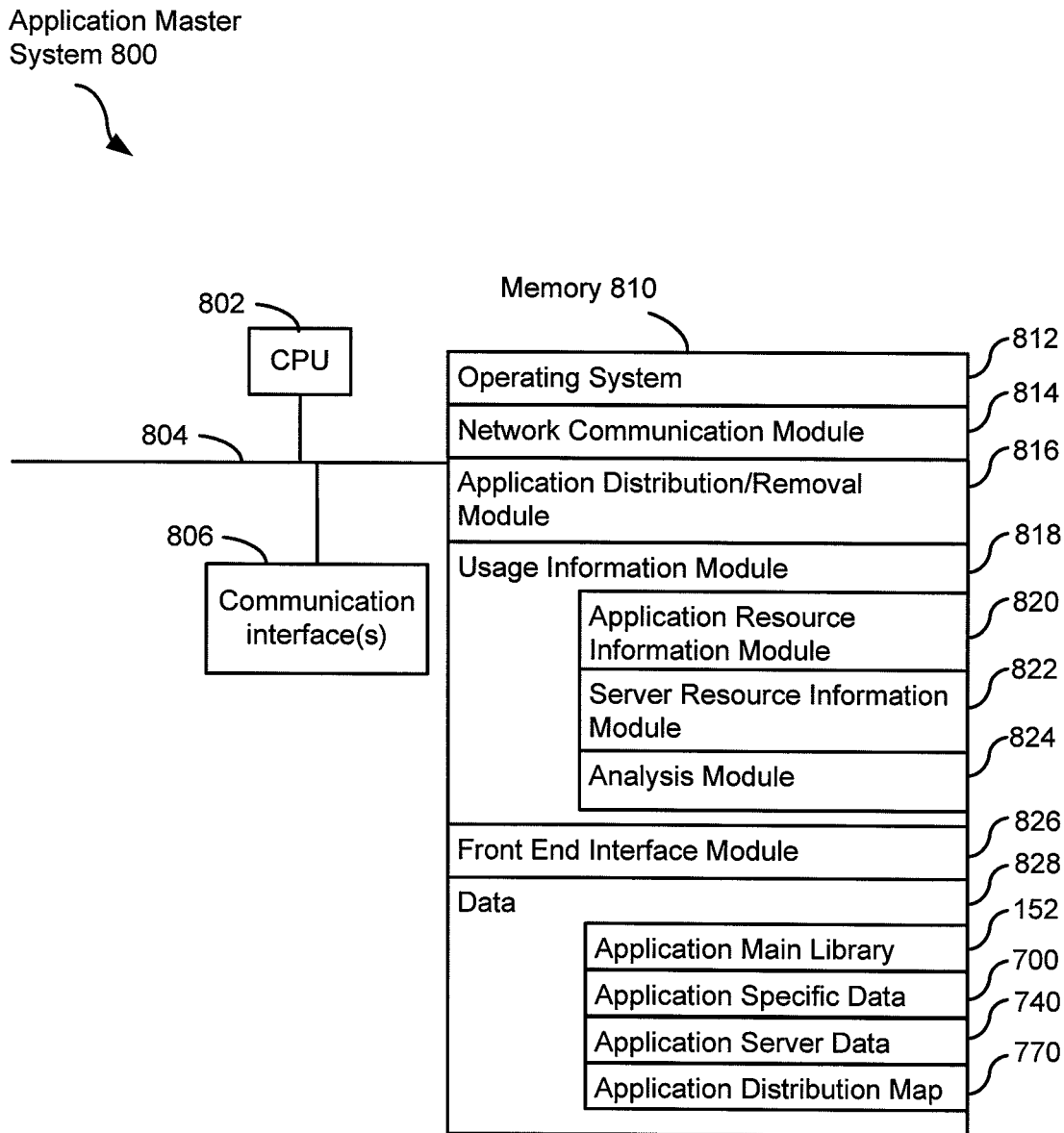
FIG. 8 is a block diagram of an application master, which may implemented using one or more servers in accordance with some embodiments.

FIG. 8 is a block diagram of an application master 800, which may implemented using one or more servers. For convenience, the application master 800 is herein described as implemented using a single server or other computer. The application master 800 generally includes one or more processing units (CPU's) 802, one or more network or other communications interfaces 806, memory 810, and one or more communication buses 804 for interconnecting these components. The communication buses 804 may include circuitry (sometimes called a chipset) that interconnects and controls communications between system components. Memory 810 may include high speed random access memory and may also include non-volatile memory, such as one or more magnetic disk storage devices. Memory 810 may include mass storage (e.g., data store 170, FIG. 1) that is remotely located from the central processing unit(s) 802. Memory 810, or alternately the non-volatile memory device(s) within memory 810, comprises a computer readable storage medium. In some embodiments, memory 810 stores the following programs, modules and data structures, or a subset thereof:

- an operating system 812 that includes procedures for handling various basic system services and for performing hardware dependent tasks;
- a network communication module 814 that is used for connecting the application master 800 to other computers via the one or more communication network interfaces 806 (wired or wireless) and one or more communication networks, such as the Internet, other wide area networks, local area networks, metropolitan area networks, and the like;

an application distribution/removal module 816 that is used for distributing applications from the main library 152 to the application servers 160 for storage in non volatile storage of the application servers; the application distribution/removal module 816 also includes instructions for removing previously distributed applications from the non-volatile storage of respective application servers in accordance with usage information, as discussed above with reference to FIG. 6B;

a usage information module 818 that includes procedures for monitoring the application servers to generate usage information;

a front end interface module 826 that is used for interfacing with the front end servers 140 (FIG. 1); and data 828, which includes the main library data 152, application specific data 700, application server data 740, and the application distribution map 770.

The procedures in the usage information module 818 include an Application Resource Information Module 820 to retrieve application resource information (e.g., application specific data stored in data structure 700, FIG. 7A), and a server resource information module 822 to retrieve resource information concerning the application servers (e.g., application server data stored in data structure 740, FIG. 7B). In some embodiments, the usage information module 818 also includes one or more procedures 824 (Analysis Module) for analyzing the retrieved application resource and server resource information to generate usage statistics.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 810 may store a subset of the modules and data structures identified above. Furthermore, memory 810 may store additional modules and data structures not described above.

Figure 9:
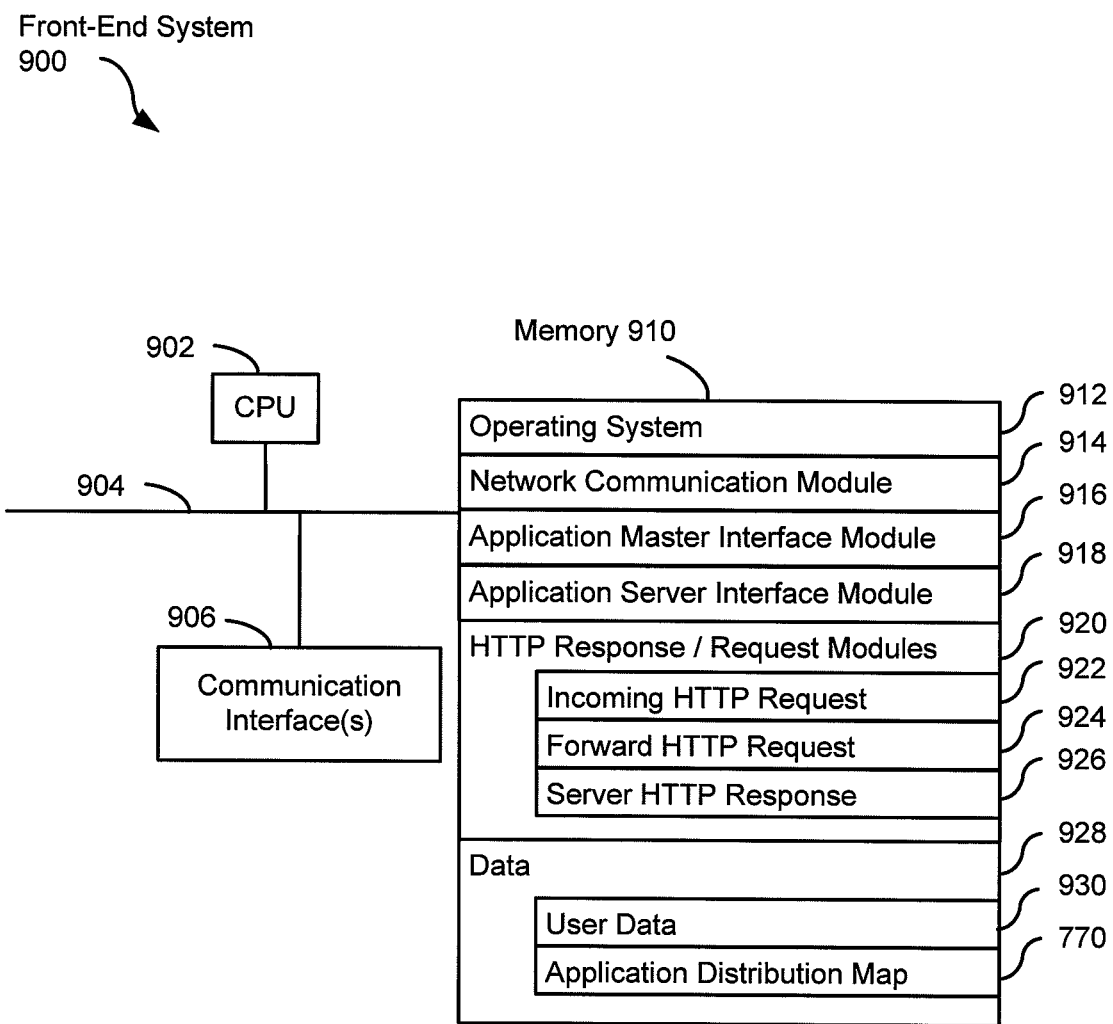
FIG. 9 is a block diagram of a front-end system, which may implemented using one or more servers in accordance with some embodiments.

FIG. 9 is a block diagram of a front-end system 900, which may implemented using one or more servers. For convenience, the front-end system 900 is herein described as implemented using a single server or other computer. The front-end system 900 generally includes one or more processing units (CPU's) 902, one or more network or other communications interfaces 906, memory 910, and one or more communication buses 904 for interconnecting these components. The communication buses 904 may include circuitry (sometimes called a chipset) that interconnects and controls communications between system components. Memory 910 may include high speed random access memory and may also include non-volatile memory, such as one or more magnetic disk storage devices. Memory 910 may include mass storage (e.g., data store 170, FIG. 1) that is remotely located from the central processing unit(s) 902. Memory 910, or alternately the non-volatile memory device(s) within memory 910, comprises a computer readable storage medium. In some embodiments, memory 910 stores the following programs, modules and data structures, or a subset thereof:

an operating system 912 that includes procedures for handling various basic system services and for performing hardware dependent tasks;

a network communication module 914 that is used for connecting the front-end 900 to other computers via the one or more communication network interfaces 906 (wired or wireless) and one or more communication networks, such as the Internet, other wide area networks, local area networks, metropolitan area networks, and the like;

an application master interface module 916 that is used for interfacing with the application master 150 (FIG. 1);

an application server interface module 918 that is used for interfacing with the application servers 160 (FIG. 1);

response and request modules 920 for handling incoming client 102 requests for applications. In some embodiments, the response and request modules 920 include procedures for receiving incoming requests (Incoming HTTP Request) 922 and for forwarding the HTTP Request to application servers 160 (FIG. 1) that host the requested application (Forward HTTP Request) 924. The response and request modules 920 may also include procedures for serving responses from the application servers 160 to the clients 102 (Server HTTP Response) 926.

data 928 which includes user data 930 and the application distribution map 770. In some embodiments, the user data 930 include client-specific information passed to the front-end 140 by the client 102 (e.g., parameters embedded in the HTTP request). The application distribution map 770 includes information used by the front-end to route application processing requests to application servers. This is described in more detail above with reference to FIG. 7C.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 910 may store a subset of the modules and data structures identified above. Furthermore, memory 910 may store additional modules and data structures not described above.

Figure 10:
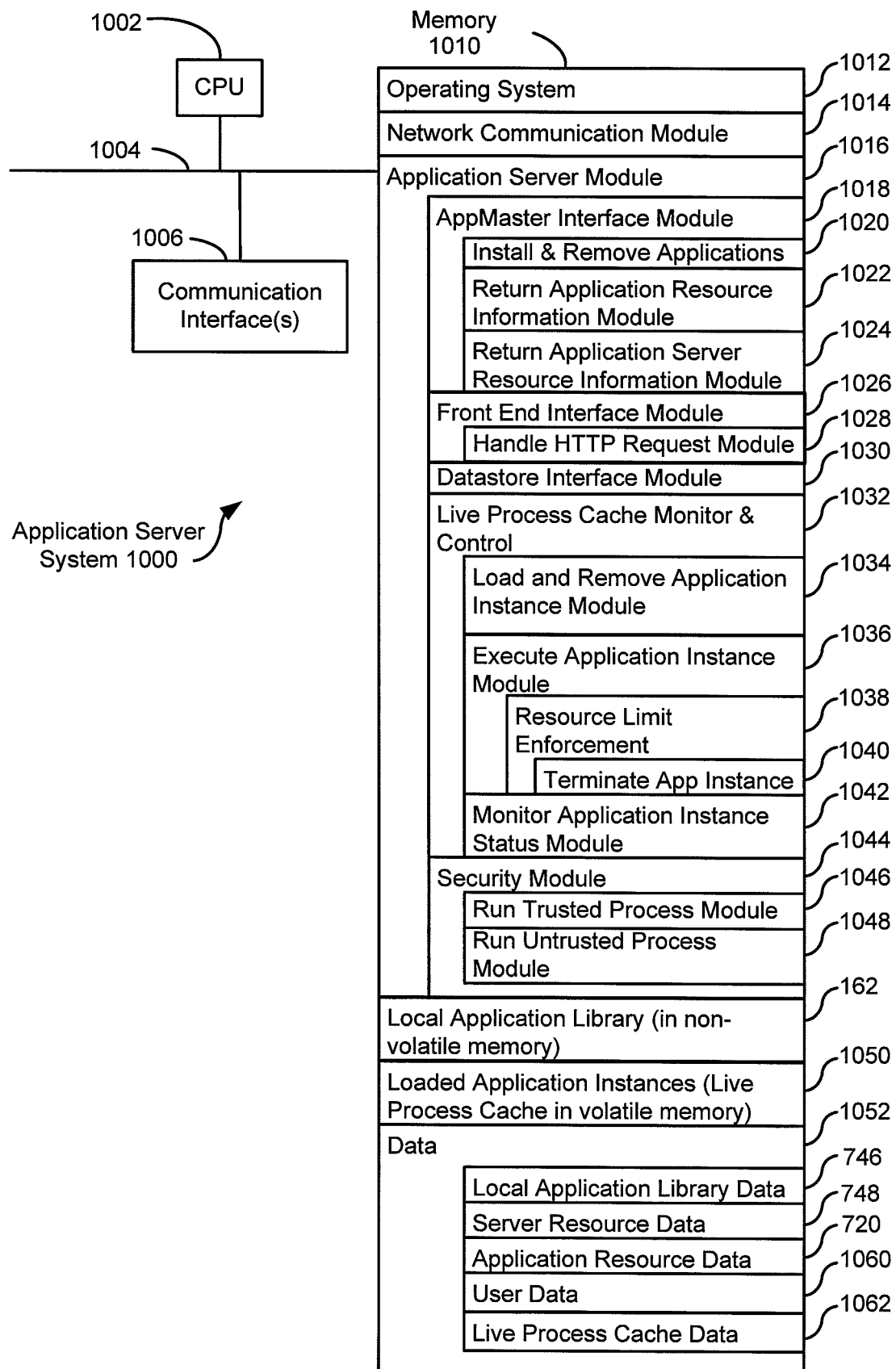
FIG. 10 is a block diagram of an application server in accordance with some embodiments.

FIG. 10 is a block diagram of an application server 1000, which may implemented using one or more servers, in accordance with some embodiments. For convenience, the application server 1000 is herein described as implemented using a single server or other computer. The application server 1000 generally includes one or more processing units (CPU's) 1002, one or more network or other communications interfaces 1006, memory 1010, and one or more communication buses 1004 for interconnecting these components. The communication buses 1004 may include circuitry (sometimes called a chipset) that interconnects and controls communications between system components. Memory 1010 may include high speed random access memory and may also include non-volatile memory, such as one or more magnetic disk storage devices. Memory 1010 may include mass storage (e.g., data store 170, FIG. 1) that is remotely located from the central processing unit(s) 1002. Memory 1010, or alternately the non-volatile memory device(s) within memory 1010, comprises a computer readable storage medium. In some embodiments, memory 1010 stores the following programs, modules and data structures, or a subset thereof:

an operating system 1012 that includes procedures for handling various basic system services and for performing hardware dependent tasks;

a network communication module 1014 that is used for connecting the application server 1000 to other computers via the one or more communication network interfaces 1006 (wired or wireless) and one or more communication networks, such as the Internet, other wide area networks, local area networks, metropolitan area networks, and the like;

an application server module 1016 that is used for processing application requests. In some embodiments, the application server module 1016 includes an application master interface module 1018 for interfacing with the application master 150 (FIG. 1), a front-end interface module for interfacing with the front-end 140, a data store interface module for interfacing with the data store 170, a live process cache monitor and control 1032 for managing application instances in the live process cache 750 (FIG. 7B). The application server module 1016 may also store a security module 1044 for executing untrusted processes (Run Untrusted Process Module) 1048 and trusted processes (Run Trusted Process Module) 1046. Some of the procedures included in the application server module 1016 are further described below.

a local application library 162, for storing the applications distributed to the application server by the application master 150;

application instances in volatile memory 1050 (e.g., in a live process cache 750, FIG. 7B) for servicing application requests. In some embodiments, there is at least one application instance for an application in volatile memory.

data 1052, which includes local application library data 746, described above with reference to FIG. 7B, server resource data 748, described above with reference to FIG. 7B, and application resource data 720, described above with reference to FIG. 7A. When needed, data 1052 includes user data 1060, which may include data received from a requesting user (e.g., user name, passwords, user preferences, profiling information) and/or data produced or retrieved for the requesting user by the application server. In addition, data 1052 may include live process cache data 562, described above with reference to FIG. 4.

In some embodiments, both application resource data 720 and server resource data 748 are sent by the application server to the application master 150, which allows the application master 150 to monitor the application servers 160 and generate usage statistics (e.g., see FIG. 6B).

In some embodiments, the application master interface module 1018 includes procedures 1020 for adding or removing applications from the non-volatile storage of the application server (Install & Remove Applications). The application master interface module 1018 may also include procedures 1022, 1024 for sending usage information on application resources (Return Application Resource Information Module) and server resources (Return Application Server Resource Information Module) to the application master. In some embodiments, the front end interface module 1026 includes procedures for handling application requests (Handle HTTP Request Module) 1028 forwarded from the front end 140.

In some embodiments, the application server module 1016 also includes procedures (Live Process Cache Monitor & Control) 1032 for monitoring and controlling the live process cache. These procedures include procedures (Load and Remove Application Instance Module) 1034 for loading and removing application instances into the live process cache in accordance with application usage and available volatile memory. There are also procedures (Execute Application Instance Module) 1036 for executing application instances when processing application requests.

The Execute Application Instance Module 1036 may also include procedures (Resource Limit Enforcement) 1038 for limiting resource consumption of a particular application. For example, an application that consumes more resources than a limit or threshold will be terminated (Terminate App Instance) 1040. The resource limit may be a predefined amount or the threshold may vary depending on factors such as the number of requests for the application. For example, applications that receive higher numbers of requests may have a higher threshold before the application instance is terminated. Alternatively, the threshold may also depend on the amount of processing resources (e.g., one or more of: CPU time, "wall clock" time (i.e., total elapsed real time), memory, communication bandwidth, and number of system function calls made) consumed by the application. The threshold(s) may be applied per execution of an application, or to a running average of resources used over multiple executions of the application. An application instance that consumes resources above a corresponding threshold may be terminated.

The live process cache monitor & control module 1032 may also include procedures for monitoring the status of application instances (Monitor Application Instance Status Module) 1042. For example, the status of the application instances may be "busy," "available," or any transitional state in between (see FIG. 3A).

Each of the above identified elements in FIGS. 4 and 10 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1010 may store a subset of the modules and data structures identified above. Furthermore, memory 1010 may store additional modules and data structures not described above.

Although FIGS. 8, 9, and 10 show an application master, a front end server and an application server, these figures are intended more as functional descriptions of the various features which may be present in a set of servers than as a structural schematic of the embodiments described herein. In practice, and as recognized by those of ordinary skill in the art, items shown separately could be combined and some items could be separated. For example, some items shown separately in FIGS. 8, 9, and 10 could be implemented on single servers and single items could be implemented by one or more servers. The actual number of servers used to implement each such subsystem and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method for executing applications in a distributed computing system, the method comprising:
receiving one or more first requests for a first application on one or more application servers of the distributed computing system, the one or more application servers maintaining a pool of application instances;
maintaining resource usage information comprising the number of instances of the first application available in the pool of application instances maintained by the one or more application servers and further comprising the frequency with which computing resources for the first application are accessed in response to requests routed to the one or more application servers;
routing the one or more first requests to the one or more application servers based on the resource usage information; and
receiving updated resource usage information specifying at least an updated number of application instances for the first application in the maintained pool of application instances.

2. The method of claim 1,
wherein maintaining resource usage information comprises maintaining an application distribution map, the application distribution map comprising data corresponding to applications of the distributed computing system, the application distribution map including the resource usage information for the first application; and
wherein routing the one or more first requests based on the resource usage information further comprises routing the one or more first requests based on the application distribution map.

3. The method of claim 2, wherein the application distribution map further comprises:
one or more identifiers each corresponding to a respective application server comprising at least one instance of the first application, and
respective distribution data for each instance of the first application, the respective distribution data comprising one or more of CPU load information and memory load information for the instance.

4. The method of claim 2, wherein the application distribution map comprises additional information comprising one or more of:
the number of requests sent to each respective application server over a predetermined period of time, and
the respective number of outstanding requests to the first application pending for each respective application server.

5. The method of claim 2, wherein the method further comprises receiving the application distribution map from an application master configured to distribute application data to application servers of the distributed computing system.

6. The method of claim 1,
wherein maintaining the resource usage information comprises maintaining averages of resource usage by instances of applications executed by each application server, including resource usage for instances of the first application; and
wherein routing the one or more first requests based on the resource usage information comprises routing the one or more first requests based at least on the maintained averages of resource usage.

7. The method of claim 1, wherein routing the one or more first requests based on the resource usage information comprises routing a first request to a first application server of the one or more application servers based on the first application server meeting predefined load criteria.

8. The method of claim 1, wherein the updated resource usage information indicates that a first application server not of the one or more application servers comprises at least one instance of the first application, and wherein the method further comprises routing one or more second requests to the first application server.

9. The method of claim 1, wherein the pool of application instances maintained by one or more application servers comprises one or more generic instances.

10. A distributed computing system for executing applications, the distributed computing system comprising one or more front-end servers configured to:
receive one or more first requests for a first application on one or more application servers the distributed computing system, the one or more application servers maintaining a pool of application instances;
maintain resource usage information comprising the number of instances of the first application available in the pool of application instances maintained by the one or more application servers and further comprising the frequency with which computing resources for the first application are accessed in response to requests routed to the one or more application servers;
route the one or more first requests to the one or more application servers based on the resource usage information; and
receive updated resource usage information specifying at least an updated number of application instances for the first application in the maintained pool of application instances.

11. The system of claim 10,
wherein in maintaining resource usage information, the one or more front-end servers are configured to maintain an application distribution map, the application distribution map comprising data corresponding to applications of the distributed computing system, the application distribution map including the resource usage information for the first application; and
wherein in routing the one or more first requests based on the resource usage information, the one or more front-end servers are configured to route the one or more first requests based on the application distribution map.

12. The system of claim 11, wherein the application distribution map further comprises:
one or more identifiers each corresponding to a respective application server comprising at least one instance of the first application, and
respective distribution data for each instance of the first application, the respective distribution data comprising one or more of CPU load information and memory load information for the instance.

13. The system of claim 11, wherein the application distribution map comprises additional information comprising one or more of:
the number of requests sent to each respective application server over a predetermined period of time, and
the respective number of outstanding requests to the first application pending for each respective application server.

14. The system of claim 11, wherein the one or more front-end servers are further configured to receive the application distribution map from an application master configured to distribute application data to the one or more application servers.

15. The system of claim 10,
wherein in maintaining the resource usage information, the one or more front-end servers are configured to maintain averages of resource usage by instances of applications executed by each application server, including resource usage for instances of the first application; and
wherein in routing the one or more first requests based on the resource usage information, the one or more front-end servers are configured to route the one or more first requests based at least on the maintained averages of resource usage.

16. The system of claim 10, wherein in routing the one or more first requests based on the resource usage information, the one or more front-end servers are configured to route a first request to a first application server of the one or more application servers based on the first application server meeting predefined load criteria.

17. The system of claim 10, wherein the updated resource usage information indicates that a first application server not of the one or more application servers comprises at least one instance of the first application, and wherein the one or more front-end servers are further configured to route one or more second requests to the first application server.

18. The system of claim 10, wherein the pool of application instances maintained by one or more application servers comprises one or more generic instances.

* * * * *